(12) United States Patent
Chung et al.

(10) Patent No.: US 10,631,158 B2
(45) Date of Patent: Apr. 21, 2020

(54) SERVER, USER TERMINAL APPARATUS, ELECTRONIC APPARATUS, AND CONTROL METHOD THEREOF

(71) Applicant: Samsung Electronics Co., Ltd., Suwon-si, Gyeonggi-do (KR)

(72) Inventors: Seongwook Chung, Suwon-si (KR); Sungjun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/564,561

(22) Filed: Sep. 9, 2019

(65) Prior Publication Data

US 2020/0084608 A1  Mar. 12, 2020

(30) Foreign Application Priority Data

Sep. 12, 2018 (KR) .................. 10-2018-0109112

(51) Int. Cl.
| | | |
|---|---|---|
| *H04W 4/90* | (2018.01) | |
| *H04W 4/02* | (2018.01) | |
| *G08B 27/00* | (2006.01) | |
| *H04W 64/00* | (2009.01) | |
| *H04W 8/00* | (2009.01) | |

(52) U.S. Cl.
CPC ............ *H04W 4/90* (2018.02); *G08B 27/006* (2013.01); *H04W 4/026* (2013.01); *H04W 8/005* (2013.01); *H04W 64/003* (2013.01)

(58) Field of Classification Search
CPC ..... H04W 4/90; H04W 8/005; H04W 64/003; H04W 4/026; G08B 27/006
See application file for complete search history.

(56) References Cited

U.S. PATENT DOCUMENTS

| 8,755,767 B2 | 6/2014 | Maier et al. |
| 9,980,086 B2 | 5/2018 | Dunn et al. |
| 10,375,758 B2 * | 8/2019 | Musgrove ............... H04W 4/90 |
| 2008/0162667 A1 | 7/2008 | Verma et al. |
| 2009/0163170 A1 | 6/2009 | Norp et al. |

(Continued)

FOREIGN PATENT DOCUMENTS

| EP | 2 919 213 A1 | 9/2015 |
| KR | 10-1079343 B1 | 11/2011 |

(Continued)

OTHER PUBLICATIONS

International Search Report dated Jan. 3, 2020, issued in International Patent Application No. PCT/KR2019/011634.

*Primary Examiner* — Marisol Figueroa
(74) *Attorney, Agent, or Firm* — Jefferson IP Law, LLP

(57) ABSTRACT

A server is provided. The server includes a communication interface and a processor configured to transmit a request to operate in emergency mode to an electronic apparatus through the communicator, and while the electronic apparatus is operating in emergency mode, based on information on an Internet Protocol (IP) address of the electronic apparatus being received from a user terminal apparatus that is communicatively connected to the electronic apparatus, transmit map information corresponding to a location of the electronic apparatus to the user terminal apparatus based on location information of the electronic apparatus matched with the IP address.

20 Claims, 17 Drawing Sheets

(56) References Cited

U.S. PATENT DOCUMENTS

| | | | |
|---|---|---|---|
| 2013/0331053 A1* | 12/2013 | Vick | H04W 12/08 |
| | | | 455/404.1 |
| 2014/0293865 A1* | 10/2014 | Shi | G08B 21/10 |
| | | | 370/312 |
| 2015/0334545 A1 | 11/2015 | Maier et al. | |
| 2016/0205514 A1* | 7/2016 | Ikeda | H04W 4/043 |
| | | | 455/456.1 |
| 2016/0295364 A1 | 10/2016 | Zakaria | |
| 2018/0114429 A1 | 4/2018 | Adam, Jr. et al. | |

FOREIGN PATENT DOCUMENTS

| | | |
|---|---|---|
| KR | 10-2017-0059261 A | 5/2017 |
| KR | 10-1848276 B1 | 4/2018 |
| WO | 2017/105652 A1 | 6/2017 |

* cited by examiner

FIG. 3

| AP | IP | Location |
|---|---|---|
| AP 1 | 123.123.100.... | Location 1 |
| AP 2 | 123.123.200.... | Location 2 |
| AP 3 | 123.123.300.... | Location 3 |
| AP 4 | 123.123.400.... | Location 4 |

SERVER, USER TERMINAL APPARATUS, ELECTRONIC APPARATUS, AND CONTROL METHOD THEREOF

CROSS-REFERENCE TO RELATED APPLICATION(S)

This application is based on and claims priority under 35 U.S.C. § 119(a) of a Korean patent application number 10-2018-0109112, filed on Sep. 12, 2018, in the Korean Intellectual Property Office, the disclosure of which is incorporated by reference herein in its entirety.

BACKGROUND

1. Field

The disclosure relates to a user terminal apparatus and a control method thereof. More particularly, the disclosure relates to a user terminal apparatus capable of controlling a plurality of devices and a control method thereof.

2. Description of Related Art

In case of emergency situations such as fire, flooding, explosions and the like in a building, it is necessary to evacuate occupants of the building safely. Particularly, in case of large buildings such as department stores, movie theaters, and the like, there is a greater need for evacuating occupants in that a lot of occupants are in the building and many occupants are not aware of an evacuation route in the building.

In order to cope with such emergency situations, various control systems are being developed.

The control system of the related art provides the evacuation route to occupants by using an application for guiding the evacuation route.

However, in such case, there is an inconvenience to the users in installing the application separately for following the evacuation route on their mobile terminal by themselves.

Another control system of the related art obtains user information such as a mobile number from a mobile terminal located in a building in advance, and transmits a notification message such as a text message alarming the user of the mobile terminal when an emergency has occurred.

However, such system may cause an invasion of privacy due to a possibility of personal information leakage, such as the mobile number of the mobile terminal.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an evacuation route to a user in the event of an emergency without installing a separate application or obtaining user information.

Additional aspects will be set forth in part in the description which follows and, in part, will be apparent from the description, or may be learned by practice of the presented embodiments.

In accordance with an aspect of the disclosure, a server is provided. The server includes a communication interface and at least one processor configured to transmit a request to operate in emergency mode to an electronic apparatus through the communicator, and while the electronic apparatus is operating in emergency mode, based on information on an Internet Protocol (IP) address of the electronic apparatus being received from a user terminal apparatus that is communicatively connected to the electronic apparatus, transmit map information corresponding to a location of the electronic apparatus to the user terminal apparatus based on location information of the electronic apparatus matched with the IP address.

The at least one processor, based on information on a point where a predetermined event has occurred being received from an external server, may determine the electronic apparatus located within a predetermined distance from the point where the predetermined event has occurred, and transmit the request to operate in emergency mode to the electronic apparatus.

The at least one processor may transmit the map information including the information on the point where the predetermined event has occurred to the user terminal apparatus.

The at least one processor, while the electronic apparatus operates in emergency mode, may transmit a request for disabling an authentication process of the electronic apparatus to the electronic apparatus in order that the user terminal apparatus is connected to the electronic apparatus without authentication.

The at least one processor may transmit the map information including information on an evacuation route for evacuating a place where the electronic apparatus is located to the user terminal apparatus.

The at least one processor, based on the information on the point where the predetermined event has occurred being received from the external server, may transmit map information that the evacuation route is changed according to the point where the predetermined event has occurred to the user terminal apparatus.

The server may further include a storage for matching location information by each IP address of the electronic apparatus to store.

The at least one processor, based on the location information, may determine at least one other electronic apparatus within the predetermined distance from the electronic apparatus matched with the IP address, and transmit the request to operate in emergency mode to the at least one other electronic apparatus.

The at least one processor, based on information on an IP address of a first electronic apparatus and information on an IP address of a second electronic apparatus being received from the user terminal apparatus at a predetermined time interval, based on the location information matched with the IP address, may determine locations of the first electronic apparatus and the second electronic apparatus and transmit map information corresponding to a midway point of a virtual line connecting the location of the first electronic apparatus and the location of the second electronic apparatuses to the user terminal apparatus.

The at least one processor, based on the information that the predetermined event has occurred being received from an Internet of Things (IoT) device, may determine the electronic apparatus within the predetermined distance from the IoT device and transmit the request to operate in emergency mode to the electronic apparatus.

In accordance with another aspect of the disclosure, a control method of a server is provided. The control method includes transmitting a request to operate in emergency mode to an electronic apparatus, and while the electronic apparatus is operating in emergency mode, based on the information on an IP address of the electronic apparatus being received from a user terminal apparatus that is communicatively connected to the electronic apparatus, based on location information of the electronic apparatus matched with the IP address, transmitting map information corresponding to a location of the electronic apparatus to the user terminal apparatus.

The transmitting to the electronic apparatus, based on the information on a point where the predetermined event has occurred being received from the external server, may determine an electronic apparatus located within the predetermined distance from the point where the predetermined event has occurred and transmit the request to operate in emergency mode to the electronic apparatus.

The transmitting to the user terminal apparatus may transmit the map information including information on the point where the predetermined event has occurred to the user terminal apparatus.

The method may further include, while the electronic apparatus is operating in emergency mode, transmitting a request for disabling an authentication process of the electronic apparatus to the electronic apparatus in order that the user terminal apparatus is connected to the electronic apparatus without authentication.

The transmitting to the user terminal apparatus may transmit the map information including information on an evacuation route for evacuating a place where the electronic apparatus is located to the user terminal apparatus.

The transmitting to the user terminal apparatus, based on the information on the point where the predetermined event has occurred being received from the external server, may transmit map information that the evacuation route is changed according to the point where the predetermined event has occurred to the user terminal apparatus.

The method may further include, based on location information of an electronic apparatus matched by each the predetermined IP address, determining at least one other electronic apparatus within the predetermined distance from the electronic apparatus matched with the IP address, and transmitting the request to operate in emergency mode to the at least one other electronic apparatus.

The method may further include, based on information on an IP address of the first electronic apparatus and information on an IP address of a second electronic apparatus being received from the user terminal apparatus at the predetermined time interval, based on the location information matched with the IP address, determining locations of the first electronic apparatus and the second electronic apparatus, and transmitting map information corresponding to a midway point of a virtual line connecting the location of the first electronic apparatus and the location of the second electronic apparatus to the user terminal apparatus.

The transmitting to the electronic apparatus, based on the information that the predetermined event has occurred being received from an IoT device, may determine the electronic apparatus within the predetermined distance from the IoT device and transmit the request to operate in emergency mode to the electronic apparatus.

In accordance with another aspect of the disclosure, electronic system is provided. The electronic system includes a server configured to transmit a request to operate in emergency mode, and while the electronic apparatus is operating in emergency mode, based on a request for accessing to a web server being transmitted to the electronic apparatus, a user terminal apparatus configured to receive a response including a Universal Resource Locator (URL) address of the server different from the web server from the electronic apparatus and transmit a request for accessing to the web server based on the URL address to the server, wherein the server is configured to, based on the request for accessing that includes information on an IP address of the electronic apparatus being received from the user terminal apparatus, based on location information of the electronic apparatus matched with the IP address, transmit map information corresponding to a location of the electronic apparatus to the user terminal apparatus.

According to the above-described various embodiments, an evacuation route may be provided to users in the event of an emergency without installing a separate application or obtaining user information.

In addition, even when the users are not aware of an emergency, the users may be notified that an emergency has occurred, and an evacuation route may be provided to the users.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 is a schematic illustration of a data structure associated with location information corresponding to an IP address according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Also, there may be some terms arbitrarily selected by an applicant. Such terms may be construed according to meanings defined in the specification, and may also be construed based on general contents of the specification and a typical technical concept in the art unless the terms are not specifically defined.

In describing example embodiments, detailed description of relevant known functions or components may be omitted if it would obscure the description of the subject matter.

Further, although embodiments of the disclosure are described with reference to the accompanying drawings and contents described in the accompanying drawings, the disclosure is not restricted or limited by the embodiments.

Hereinafter, certain embodiments will now be explained in detail with reference to the accompanying drawings.

Figure 1:
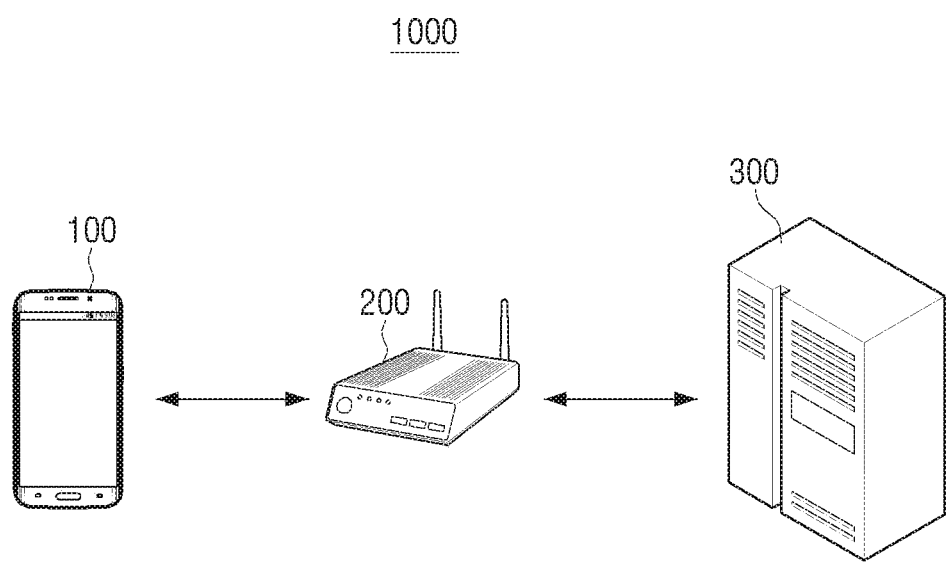
FIG. 1 is a schematic illustration of a communication network according to an embodiment of the disclosure.

FIG. 1 is a schematic illustration of a communication network according to an embodiment of the disclosure.

Referring to FIG. 1, a communication network system 1000 according to an embodiment includes a user terminal apparatus 100, an electronic apparatus 200 and a server 300.

Referring to FIG. 1, the user terminal apparatus 100 may be an electronic apparatus such as a smartphone. However, it is merely an embodiment, and the user terminal apparatus 100 may be various electronic apparatuses that is portable or a user can carry, such as a tablet Personal Computer (PC), a notebook, a camcorder, and the like. In addition, the user terminal apparatus 100 may be implemented as various wearable apparatuses that a user can wear on the user's body, such as a smart watch, smart gear, and the like.

The user terminal apparatus 100 may establish communication with the electronic apparatus 200. Specifically, the user terminal apparatus 100 may establish communication with the electronic apparatus 200 through a Wi-Fi network. However, this is merely an embodiment, and the user terminal apparatus 100 may establish communication with the electronic apparatus 200 through various communication links such as Bluetooth, ZigBee, and the like.

The user terminal apparatus 100 may establish communication with the server 300. For example, in an embodiment, the user terminal apparatus 100 may establish communication with the server 300 via the electronic apparatus 200. In this case, the user terminal apparatus 100 may be communicatively connected to the electronic apparatus 200 through a communication link such as Wi-Fi, Bluetooth, ZigBee, and the like.

In another embodiment, the user terminal apparatus 100 may directly establish communication with the server 300. For example, the user terminal apparatus 100 may establish communication with the server 300 through wireless communications such as 3rd Generation (3G), 3rd Generation Partnership Project (3GPP), Long Term Evolution (LTE), and the like. However, this is merely an embodiment, the user terminal apparatus 100 may establish communication with the server 300 through various wireless communications such as 5G Networks (5G).

As illustrated in FIG. 1, the electronic apparatus 200 may be an Access Point (AP). For example, the electronic apparatus 200 may be an AP that relays communication between the user terminal apparatus 100 and the server 300. However, this is merely an embodiment, and the electronic apparatus 200 may include one or more electronic apparatuses for relaying communication between the user terminal apparatus 100, such as an IoT hub, a router, a bridge, a repeater, a femtocell, and the like, and the server 300.

For this operation, the electronic apparatus 200 may establish communication with the server 300. For example, the electronic apparatus 200 may establish communication with the server 300 through a Wi-Fi network. However, this is merely an embodiment, the electronic apparatus 200 may establish communication with the server 300 through various communication links such as mobile communication, local area communication (LAN), wide area communication (WAN), and the like.

Such electronic apparatus 200 may be installed on each floor in a building, and may be installed in multiple places, such as a lobby, an office, a restroom and the like, of each floor.

The server 300 may provide information for an evacuation route through the terminal apparatus 100 when an emergency has occurred such as a fire, flooding, an explosion, police activity and the like in a building. For example, the server 300 may provide information for the evacuation route generated based on location information of the electronic apparatus 200 communicatively connected with the user terminal apparatus 100 to the user terminal apparatus 100 through the electronic apparatus 200.

This takes into account that the user terminal apparatus 100 communicatively connected to the electronic apparatus 200 is generally located near the electronic apparatus 200.

Accordingly, a user of the user terminal apparatus 100 may recognize that an emergency has occurred in a building and may quickly evacuate to a safety zone according to the evacuation route provided via the user terminal apparatus 100.

Hereinafter, information on the evacuation route provided by the server 300 according to an embodiment will be described in more detail with reference to the accompanying drawings.

Figure 2:
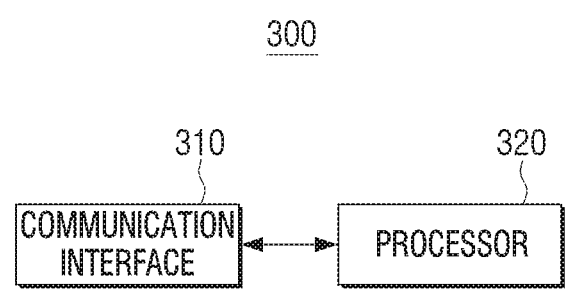
FIG. 2 is a block diagram illustrating a server according to an embodiment of the disclosure.

FIG. 2 is a block diagram illustrating a server according to an embodiment of the disclosure.

Referring to FIG. 2, the server 300 according to an embodiment includes a communication interface 310 and a processor 320.

The communication interface 310 may establish communication with an electronic apparatus 200 and transmit/receive various data. For example, the communication interface 310 may establish communication with the electronic apparatus 200 through one or more communication links such as Bluetooth and the like to transmit/receive various data. In an exemplary embodiment, the communication interface 310 may be a transceiver.

For example, the communication interface 310 may transmit a request to operate in emergency mode to the electronic apparatus 200. The request to operate in emergency mode may be a request for converting a mode of the electronic apparatus 200 currently operating in a normal mode to emergency mode. While operating in the normal mode, the electronic apparatus 200 may, based on a request for accessing to a web server being received from the user terminal apparatus 100, access a web server and provide information requested by a user through the user terminal apparatus 100. Details associated with the emergency mode will be described later.

The communication interface 310 may transmit a request for disabling an authentication process of the electronic apparatus. The request for disabling the authentication process may refer to a request for disabling the authentication process of the electronic apparatus 200 in order that the user terminal apparatus 100 is communicatively connected to the electronic apparatus 200 without passing through the authentication process of the electronic apparatus 200.

Additionally, or alternatively, the communication interface 310 may establish communication with the user terminal apparatus 100 to transmit/receive various data. Specifically, the communication interface 310 may establish communication with the user terminal apparatus 100 through various wireless communication such as 3rd Generation (3G), 3rd Generation Partnership Project (3GPP), Long Term Evolution (LTE), and the like to transmit/receive various data.

The communication interface 310 may establish communication with the user terminal apparatus 100 via the electronic apparatus 200 to transmit/receive various data. In this case, the user terminal apparatus 100 may be communicatively connected to the electronic apparatus 200 through communication links such Wi-Fi, Bluetooth, ZigBee, and the like.

For example, the communication interface 310 may receive information on an IP address from the user terminal apparatus 100. The IP address may be an IP address of the electronic apparatus 200 which is communicatively connected to the user terminal apparatus 100.

The communication interface 310 may transmit map information corresponding to a location of the electronic apparatus 200 with respect to the user terminal apparatus 100. Specifically, the communication interface 310 may transmit map information generated based on the location of the electronic apparatus 200 with respect to the user terminal apparatus 100. The map information may include information on the evacuation route for evacuating a place where the electronic apparatus 200 is located.

For this operation, the communication interface 310 may include at least one of a Wi-Fi chip, a Bluetooth chip, a wireless communication chip, and the like.

The processor 320 may control an overall operation of the server 300. The processor 320 may include one or more of a central processing unit (CPU), application processor (AP), or communication processor (CP).

The processor 320 may control the communication interface 310 in order to transmit the request to operate in emergency mode to the electronic apparatus 200.

For example, the processor 320 may, based on the information that the predetermined event has occurred being received from the external server, control the communication interface 310 to transmit the request to operate in emergency mode to the electronic apparatus 200. The predetermined event may be an emergency such as a fire, flooding, an explosion, and the like. In addition, the external server may be a server for managing and controlling an emergency such as a 911 control server, a national disaster control server, and the like.

The information that the predetermined event has occurred may include information on a point where the predetermined event has occurred. For example, the information that the predetermined event has occurred may include information where an emergency has occurred in a building associated with the server 300. For example, when a fire has occurred on a second floor in the building in which the server 300 is installed, information that the predetermined event has occurred may include information that the fire has occurred on the second floor in the building associated with the server 300.

The processor 320 may, based on information on the point where the predetermined event has occurred being received from the external server, determine the electronic apparatus 200 corresponding to the point where the predetermined event has occurred.

For example, the processor 320 may determine the electronic apparatus 200 corresponding to the point where the predetermined event has occurred by using location information corresponding to the IP address of the electronic apparatus 200.

The location information matched by the IP address of the electronic apparatus may be pre-stored in the server 300.

FIG. 3 is a schematic illustration of a data structure associated with location information corresponding to an IP address according to an embodiment of the disclosure.

Referring to FIG. 3, a first electronic apparatus (AP1) having an IP address of 123.123.100 may correspond to Location 1, a second electronic apparatus (AP2) having an IP address of 123.123.200 may correspond to Location 2, a third electronic apparatus (AP3) having an IP address of 123.123.300 may correspond to Location 3, and a fourth electronic apparatus (AP4) having an IP address of 123.123.400 may correspond to Location 4.

The location corresponding to each electronic apparatus may be associated with various locations including different floors of a building, different areas of a single floor, or different buildings. For example, Location 1 to Location 4 may be the first floor to the fourth floor of a building associated with the server 300, respectively. Additionally, or alternatively, Location 1 to Location 4 may be a first area to a fourth area, respectively, of the same floor. Additionally, or alternatively, Location 1 to Location 4 may be different areas of different floors. Additionally, or alternatively, Location 1 to Location 4 may be located in different buildings.

By using such pre-stored location information, the processor 320 may, based on the information on the point where the predetermined event has occurred, being received from the external server, determine the electronic apparatus 200 corresponding to the point where the predetermined event has occurred.

For example, based on receiving information that a fire has occurred at Location 1, the processor 320 may determine that the first electronic apparatus corresponding to Location 1 to be the electronic apparatus 200 corresponding to the point where the predetermined event has occurred by using the IP address associated with the electronic device 200.

In addition, the processor 320 may transmit a request that the electronic apparatus 200 corresponding to the point where the predetermined event has occurred operates in an emergency mode.

The example described above is only an embodiment, and the processor 320 may transmit the request to operate in emergency mode to the electronic apparatus 200 corresponding to the point where the predetermined event has occurred through various methods.

For example, the processor 320 may transmit the request that the electronic apparatus 200 operate in emergency mode based on a user input or in response to receiving the user input.

In addition, the processor 320 may, based on receiving information that an emergency such as a fire has occurred from an IoT device such as a siren sensor, a heat detector, a web cam, and the like which are located at a specific location, based on location information of the IoT device, determine the electronic apparatus 200 within the predetermined distance from the IoT device, and transmit the request that the electronic apparatus 200 operate in emergency mode. For this operation, the server 300 may additionally or alternatively store the location information for each IoT device in a data structure similar to that illustrated in FIG. 3.

In an exemplary embodiment, if a signal strength between the IoT device and the electronic apparatus 200 is greater than or equal to a predetermined strength, the processor 320 may identify that the electronic apparatus 200 is within the predetermined distance from the IoT device. For this operation, the server 300 may receive information on the signal strength between the IoT device and the electronic apparatus 200 from at least one of the IoT device and the electronic apparatus 200. Alternately, the processor 320 may identify that the electronic apparatus 200 is within the predetermined distance from the IoT device based on location information on the predetermined electronic apparatus and location information on the predetermined IoT device.

The electronic apparatus 200 may, based on receiving the request to operate in emergency mode, operate in emergency mode. For example, based on or in response to receiving the request for operating in the emergency mode, the electronic apparatus 200 may transition from a normal operation mode to the emergency operation mode.

While operating in emergency mode, the electronic apparatus 200 may, based on receiving a request to access a web server from the user terminal apparatus 100, transmit a response including a URL address of the server instead of the web server to the user terminal apparatus 100.

For example, while operating in emergency mode, the electronic apparatus 200 may, based on the request to access the web server being received from the user terminal apparatus 100, transmit the response including a request that the user terminal apparatus 100 attempts to connect to the server 300 instead of the web server to the user terminal apparatus 100.

For example, based on an application that attempts to connect to a specific portal site being executed in the user terminal apparatus 100, or based on a user command that attempts to connect to a specific site being input through a specific application, the electronic apparatus 200 may receive a request for accessing a web server that manages a corresponding site from the user terminal apparatus 100. In this case, the electronic apparatus 200 may transmit the response including the URL address of the server 300 to the user terminal apparatus 100 to the user terminal apparatus 100 to attempt to connect to the server 300 instead of attempting to connect to a corresponding web server.

The response described above may include the IP address of the electronic apparatus 200. The IP address may be an IP address assigned to the user terminal apparatus 100, and the electronic apparatus 200 may be the IP address assigned to the user terminal apparatus 100 when the user terminal apparatus 100 and the electronic apparatus 200 establish a communication link.

In assigning the IP address described above, the electronic apparatus 200 may assign an IP address to the user terminal apparatus 100 after the user terminal apparatus 100 successfully perform the predetermined authentication process. For example, the electronic apparatus 200 may, based on a password set in the electronic apparatus 200 being input to the user terminal apparatus 100, assign the IP address to the user terminal apparatus 100.

When the electronic apparatus 200 provides an open network, the electronic apparatus 200 may, based on receiving a request for establishing a communication link from the user terminal apparatus 100, omit the authentication process described above and assign an IP address to the user terminal apparatus 100 (e.g., without performing the predetermined authentication process).

The user terminal apparatus 100 may transmit a request to access the server 300 to the server 300 based on the response received from the electronic apparatus 200. For example, the user terminal apparatus 100 may transmit the request for accessing to the server 300 to the server 300 based on the URL address of the server 300 included in the response from the electronic apparatus 200.

As described above, the response that the user terminal apparatus 100 receives from the electronic apparatus 200 may include the IP address of the electronic apparatus 200. Accordingly, the request to access the server 300, that is transmitted by the user terminal apparatus 100 to the server 300, may include the IP address of the electronic apparatus 200.

While the electronic apparatus 200 is operating in emergency mode, the processor 320 may, based on information on the IP address of the electronic apparatus 200 received from the user terminal apparatus 100 which is communicatively connected to the electronic apparatus 200, transmit map information corresponding to a location of the electronic apparatus 200 to the user terminal apparatus 100.

Specifically, the processor 320 may, based on information on the IP address received from the user terminal apparatus 100, determine whether the received IP address corresponds to the IP address of the electronic apparatus 200 operating in emergency mode.

When the IP address received from the user terminal apparatus 100 corresponds to the IP address operating in emergency mode, the server 300 may select and transmit map information corresponding to the location of the electronic apparatus 200 to the user terminal apparatus 100.

Such operation described above is when the user terminal apparatus 100 is communicatively connected to the electronic apparatus 200, and this is because the user terminal apparatus 100 may be regarded as being within the predetermined distance from the electronic apparatus 200.

Map information corresponding to the location of the electronic apparatus 200 may be generated based on location information corresponding to each IP address of the electronic apparatus 200. Specifically, the processor 320 may, based on the location information matched by each IP address of the electronic apparatus 200, determine the location of the electronic apparatus 200 corresponding to a received IP information and generate the map information corresponding to the electronic apparatus 200.

For example, if it is determined that the electronic apparatus 200 corresponding to the received IP information is an electronic apparatus located on the second floor of a building, the processor 320 may transmit a second floor map of the corresponding building to the user terminal apparatus 100.

The processor 320 may transmit map information including information on an evacuation route for evacuating a place where the electronic apparatus 200 is located to the user terminal apparatus 100.

For this operation, the server 300 may store information on an evacuation route by each place where the electronic apparatus 200 is located in a building associated with the server 300. The information on the evacuation route may include information on various routes to evacuate a place where the electronic apparatus 200 is located, such as information on an evacuation route from a point where the electronic apparatus 200 is located to a place where an emergency exit is located, information on an evacuation route from a place where the electronic apparatus 200 is located to a place where a descending life line is located, and the like.

For example, when the electronic apparatus 200 is located on the second floor of the building, the processor 320 may transmit map information including information on an evacuation route directing the user to proceed to the emergency exit to the user terminal apparatus 100 in order for the user to evacuate the second floor of the building.

The processor 320 may also transmit map information including information on the point where the predetermined event has occurred to the user terminal apparatus 100. As described above, the point where the predetermined event has occurred is a point where an emergency such as a fire, flooding, an explosion, and the like has occurred, and may be received from the external server as well as from the IoT device.

For example, when information that a fire has occurred in a restroom on the second floor in a building is received from the external server, the processor 320 may transmit map information including information that the fire has occurred on the second floor in the building to the user terminal apparatus 100. The point where the predetermined event has occurred included in the map information may be provided to the user terminal apparatus 100 through various UIs such as a fire icon, and may be provided to the user terminal apparatus 100 through text.

The processor 320 may transmit map information that the evacuation route is modified from the initial evacuation route according to the point where the predetermined event has occurred to the user terminal apparatus 100. Specifically, the processor 320 may, based on the predetermined event occurring at the first location, transmit information on the evacuation route except for an evacuation route within the predetermined distance from the first location to the user terminal apparatus 100.

For example, when an emergency such as a fire and the like has occurred at the first location, the processor 320 may transmit information on the evacuation route directing the user to proceed to other emergency routes except for the emergency exit within the predetermined distance from the first location to the user terminal apparatus 100.

The processor 320 may determine at least one other electronic apparatus within the predetermined distance from the electronic apparatus 200 and transmit the request to operate in emergency mode to the at least one other electronic apparatus.

For example, the processor 320 may, based on the location information matched by each IP address of the electronic apparatus, determine at least one other electronic apparatus within the predetermined distance from the electronic apparatus 200 that operates in emergency mode. In addition, the processor 320 may transmit the instruction or request to operate in emergency mode to the at least one other electronic apparatus.

For example, when the electronic apparatus 200 that operates in emergency mode is located in an office on the second floor of the building, the processor 320 may determine at least one other electronic apparatus within the predetermined distance from the office on the second floor of the building based on the location information matched by each IP address of the electronic apparatus. The at least one other electronic apparatus may be located in another office on the same floor or may be located in another office on another floor. In addition, the processor 320 may transmit the instruction or request to operate in the emergency mode to the at least one other electronic apparatus described above.

Such operation reflects that all users in a building may generally be in a dangerous situation when it comes to an emergency situation, and thus information on the evacuation route may be transmitted to the user terminal apparatus 100 that is communicatively connected to the at least one other electronic apparatus described above. That is, an evacuation route may be communicated to each user terminal apparatus 100 within the area associated with the emergency situation to allow each user to successfully evacuate the area without encountering or interfering with the point in which the emergency situation has occurred.

The processor 320 may, based on a plurality of electronic apparatuses being located within the predetermined distance from the point where the predetermined event has occurred, transmit the instruction or request to operate in the emergency mode to each of the plurality of electronic apparatuses.

For example, when a first electronic apparatus and a second electronic apparatus are located in different locations but within a predetermined distance from the point where the emergency such as a fire and the like has occurred, the processor 320 may transmit the instruction or request to operate in the emergency mode to each of the first and the second electronic apparatuses.

The predetermined distance may be variously set to a value, such as 20 m, 40 m and the like, according to a user command.

The predetermined distance may also be set differently depending on a type of the predetermined event. For example, the predetermined event may be set to 20 m in case of a fire and may be set to 50 m in a case of an explosion.

The processor 320 may, while the electronic apparatus 200 operates in the emergency mode, transmit an instruction or request for the electronic device 200 to turn off or disable the authentication process to the electronic apparatus 200 in order to allow the user terminal apparatus 100 to establish connection with the electronic apparatus 200 without authentication.

For example, when the electronic apparatus 200 provides a closed network for allocating an IP address to the user terminal apparatus 100 after passing through the predetermined authentication process in the normal mode, the processor 320 may transmit the instruction or request to disable the authentication process to the electronic apparatus 200 in order that the user terminal apparatus 100 is to be communicatively connected to the electronic apparatus 200 without passing through the authentication process of the electronic apparatus 200 in emergency mode.

Accordingly, when operating in the emergency mode, the electronic apparatus 200 may provide an open network, and the user terminal apparatus 100 may omit the predetermined authentication process such as inputting a password and the like to be communicatively connected to the electronic apparatus 200.

For example, the user terminal apparatus 100 may, based on a user input for activating a communication function such as Wi-Fi and the like being received, omit the predetermined authentication process such as inputting a password and the like to be communicatively connected to the electronic apparatus 200.

Thereafter, the processor 320 may, based on receiving a request to access the server from the user terminal apparatus 100, transmit the map information including the evacuation route described above to the user terminal apparatus 100.

Such an operation is to promptly notify the user terminal apparatus 100 that an emergency such as a fire and the like has occurred and provide information on the evacuation route.

Figure 4:
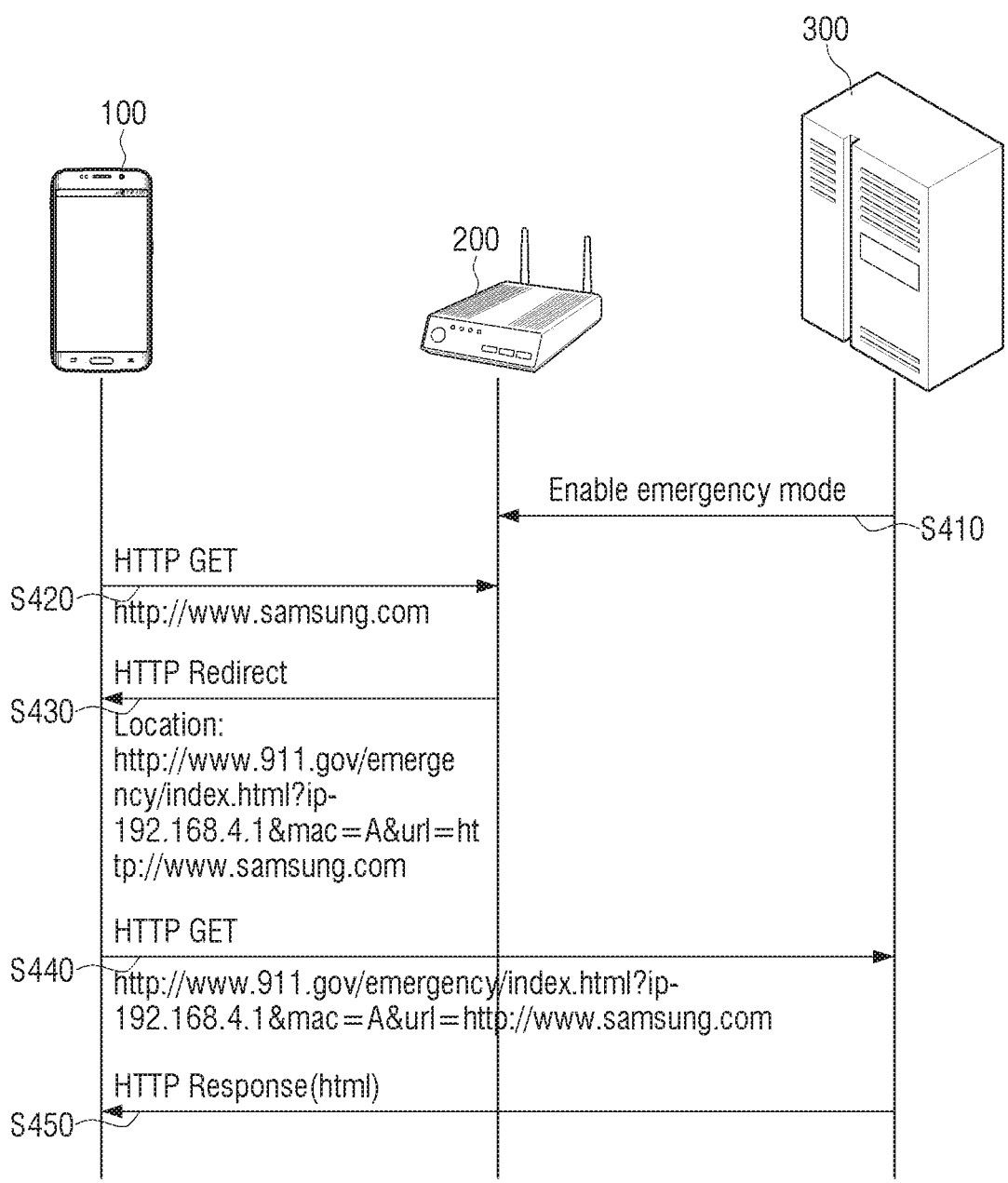
FIG. 4 is a signal flow diagram illustrating an operation of a communication network system according to an embodiment of the disclosure.

FIG. 4 is a signal flow diagram illustrating an operation of a communication network system according to an embodiment of the disclosure.

Referring to FIG. 4, assume to start that the server 300 may receive information associated with a predetermined event that has occurred. The predetermined event may be an emergency such as a fire, flooding, an explosion, and the like. In addition, the information associated with the predetermined event that has occurred may be determined by the server 300, received from another server that manages and controls an emergency such as a 911 control server, a national disaster control server, and the like, or may be received from an IoT device such as a siren sensor, a heat detector, and the like.

The information associated with the predetermined event that has occurred may include information associated with a point or location where the predetermined event has occurred. Specifically, the information associated with the predetermined event that has occurred may include information on where an emergency has occurred in a building associated with the server 300.

In addition, the server 300 may determine or identify one or more electronic apparatuses 200 corresponding to the point where the predetermined event has occurred by using location information corresponding to IP address of each electronic apparatus, and transmit, at operation S410, the request to operate in emergency mode to the corresponding electronic apparatus 200.

Put another way, in a case that the server 300 determines that a predetermined event associated with an emergency has occurred, the server 300 may identify one or more electronic apparatuses 200 associated with a location in which the predetermined event has occurred. In an exemplary embodiment, the server 300 may identify the one or more electronic apparatuses 200 based on a data structure correlating the location with each of the one or more electronic apparatuses 200. In response to identifying the one or more electronic apparatuses 200 associated with the location in which the predetermined event has occurred, the server 300 can transmit a message to the one or more electronic apparatuses 200 associated with the location in which the predetermined event has occurred such that the message includes an indication or instruction for the electronic apparatus 200 to initiate or enable operation in an emergency mode.

The electronic apparatus 200 may operate in the normal mode until the request to operate in emergency mode is received from the server 300.

While operating in the normal mode, the electronic apparatus 200 may, based on receiving a request to access a web server from the user terminal apparatus 100, access to the web server and provide information received from the web server. Put another way, in a case that the electronic apparatus 200 is operating in a normal mode, in response to receiving, from the user terminal apparatus 100, a request to access a web server, the electronic apparatus 200 may access the web server and provide the user terminal apparatus 100 the information received from the web server.

The electronic apparatus 200 may, based on the request to operate in emergency mode being received, operate in emergency mode or a normal operating mode. That is, based on receiving a request to access the web server, the electronic apparatus 200 may determine a current operation mode of the electronic apparatus 200. For example, in response to receiving, from the user terminal apparatus 100, a request to access the web server, the electronic apparatus 200 may determine whether the electronic apparatus 200 is currently operating in a normal mode or an emergency mode.

While operating in emergency mode, the electronic apparatus 200 may, based on receiving the request to access the web server, at operation S420, from the user terminal apparatus 100, and transmit, at operation S430, a response including an URL address of the server 300, not the web server, to the user terminal apparatus 100.

Put another way, in response to receiving, from the user terminal apparatus 100, the request to access the web server and determining that the electronic apparatus 200 is operating in the emergency mode, the electronic apparatus 200 may transmit, to the user terminal apparatus 100, a response including information redirecting the user terminal apparatus 100 such that the user terminal apparatus 100 initiates establishing communication with the server 300 rather than the web server associated with the request in operation S420.

For example, referring to FIG. 4, while operating in emergency mode, the electronic apparatus 200 may, based on receiving a request to access the web server corresponding to http://samsung.com from the user terminal apparatus 100, transmit a response including the URL address (e.g., http://www.911.gov/emergency) associated with the server 300, not the web server, to the user terminal apparatus 100.

The response transmitted from the electronic apparatus 200 described above may include an IP address of the electronic apparatus 200. The IP address may be an IP address assigned to the user terminal apparatus 100 by the electronic apparatus 200, and may be an IP address assigned to the user terminal apparatus 100 by the electronic apparatus 200 when the user terminal apparatus 100 transmits a request to establish a communication link with the electronic apparatus 200.

For example, referring to FIG. 4, when an IP address of the electronic apparatus 200 is 192.168.4.1, the response may include an IP address such as ip-192.168.4.1.

The user terminal apparatus 100 may transmit, at operation S440, a request for accessing to the server 300 to the server 300 based on the response received from the electronic apparatus 200. Specifically, the user terminal apparatus 100 may transmit the request for accessing to the server 300 to the server 300 based on the URL address of the server 300 included in the response.

Put another way, in response to receiving, from the electronic apparatus 200, the response including the IP address, the user terminal apparatus 100 may transmit, to the server 300, a request to access the server 300 such that the user terminal apparatus 100 may receive information associated with the emergency event that has occurred.

As described above, the response that the user terminal apparatus 100 receives from the electronic apparatus 200 may include the IP address of the electronic apparatus 200. Accordingly, the request to access the server 300 that the user terminal apparatus 100 transmits to the server 300 may include the IP address of the electronic apparatus 200.

Thereafter, the server 300 may, based on information associated with the IP address being received from the user terminal apparatus 100, determine whether the received IP address corresponds to the IP address of the electronic apparatus 200 operating in emergency mode.

When the IP address received from the user terminal apparatus 100 matches the IP address of the electronic apparatus 200 operating in emergency mode, the server 300 may transmit, at operation S450, the map information corresponding to the location of the electronic apparatus 200 to the user terminal apparatus 100.

Put another way, in response to receiving, from the user terminal apparatus 100, the request to access the server 300, the server 300 may determine whether the user terminal apparatus 100 is in communication with an electronic apparatus that is currently operating in an emergency mode. For example, the server may use information included in the request, such as the IP address, to determine information in which to transmit to the user terminal apparatus 100. For example, the server 300 may compare the IP address with a data structure including information associated with one or more electronic apparatuses to determine whether the user terminal apparatus 100 is in a location that corresponds to a location in which an emergency event has occurred. In a case that the IP address included in the request received from the user terminal apparatus 100 matches one of IP addresses included in the data structure, the server 300 may identify information to generate a map to instruct a user of the user terminal apparatus 100 to evacuate from a current position to a position that is outside an area associated with the emergency event. The server 300 may generate the evacuation map or the server 300 may transmit the information to allow the user terminal apparatus 100 to generate the map.

Figure 5:
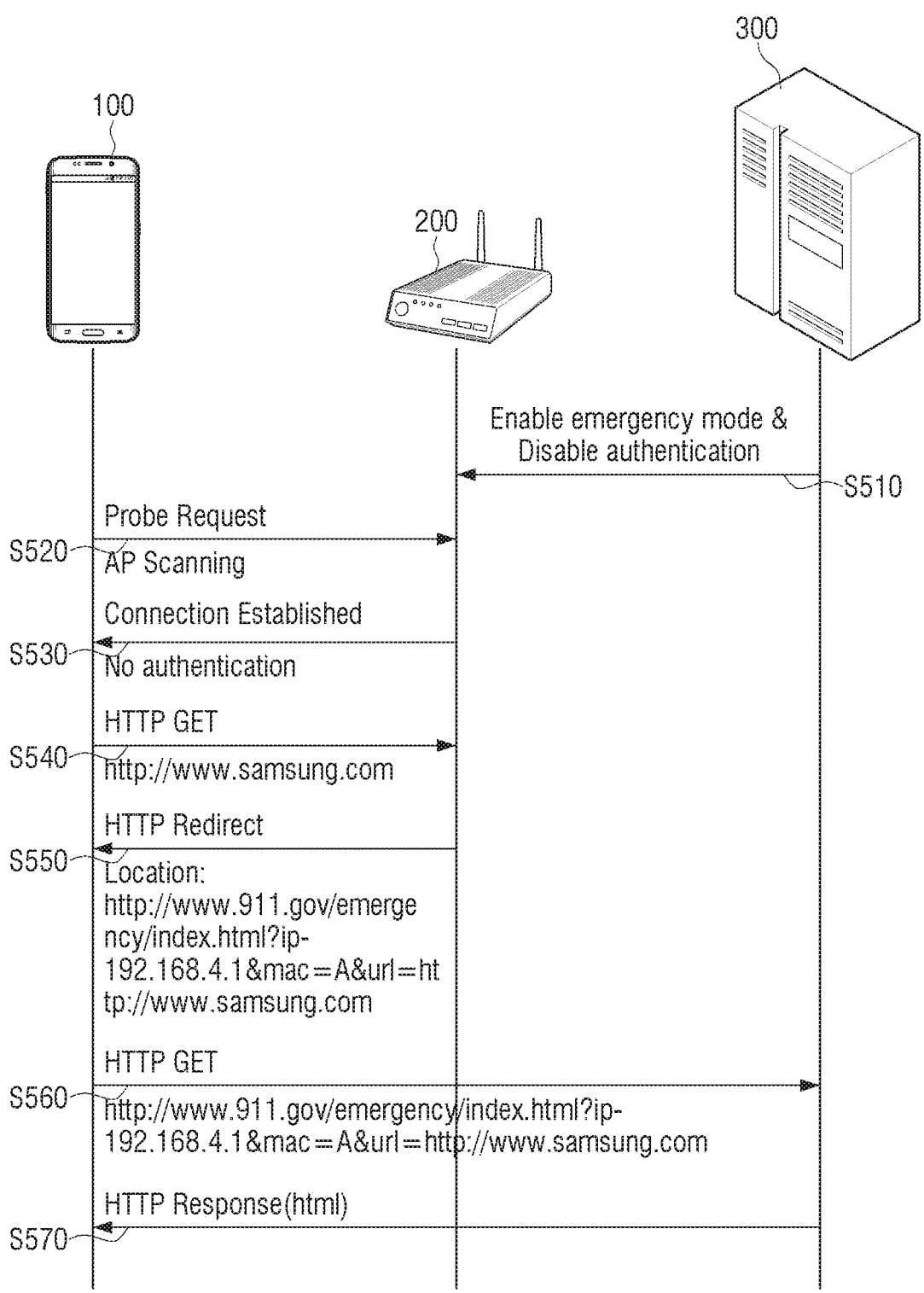
FIG. 5 is a signal flow diagram illustrating an operation of a communication network system for disabling an authentication process of an electronic apparatus according to an embodiment of the disclosure.

FIG. 5 is a signal flow diagram illustrating an operation of communication network system for disabling an authentication process of an electronic apparatus according to an embodiment of the disclosure.

Referring to FIG. 5, the server 300 may, based on receiving information that the predetermined event such as a fire and the like has occurred, transmit, at operation S510, to the electronic apparatus 200, a request to operate in emergency mode and disable the authentication process of the electronic apparatus 200. While FIG. 5 illustrates that the request to operate in the emergency mode and the request to disable the authentication process are transmitted in one signal, the server 300 may transmit each of the described messages in separate signals.

The electronic apparatus 200 may operate in emergency mode as the request to operate in emergency mode is received, and may disable the authentication process of the electronic apparatus 200 as the request to disable the authentication process is received. That is, the electronic apparatus 200 may convert the closed network into an open network.

The user terminal apparatus 100 may, based on receiving a user input for activating a communication function such as Wi-Fi network and the like, scan, at operation S520, for a peripheral electronic apparatus which can be communicatively connected. For example, in response to determining to activate a communication function, the user terminal apparatus 100 may scan for an access point capable of establishing communication corresponding to the desired communication function.

The user terminal apparatus 100 may be communicatively connected, at operation S530, to the electronic apparatus 200 without the authentication process. For example, in a case that the electronic apparatus 200 is operating in the emergency mode and the electronic apparatus 200 receives a request to establish communication with the user terminal apparatus in operation S520, the electronic apparatus 200 may grant the request to establish communication between the user terminal apparatus 100 and the electronic apparatus 200 without requiring a predetermined authentication process. In contrast, in a case that the electronic apparatus 200 receives the request to establish communication while operating in a normal operation mode and the authentication process is enabled, the electronic apparatus 200 may require that the user terminal apparatus 200 successfully perform the authentication process before the electronic apparatus 200 grants the request to establish communication between the user terminal apparatus 100 and the electronic apparatus 200.

While operating in emergency mode, the electronic apparatus 200 may, based on receiving a request to access the web server, at operation S540, from the user terminal apparatus 100, transmit, at operation S550, a response including the URL address of the server 300, not the web server, to the user terminal apparatus 100. Meanwhile, the response described above may include the IP address of the electronic apparatus 200.

The user terminal apparatus 100 may transmit, at operation S560, a request to access the server 300 to the server 300 based on the response received from the electronic apparatus 200.

As described above, the response that the user terminal apparatus 100 receives from the electronic apparatus 200 may include the IP address of the electronic apparatus 200. Thus, the request to access the server 300 that the user terminal apparatus 100 transmits to the server 300 may include the IP address of the electronic apparatus 200.

Thereafter, the server 300 may, based on information on the IP address received from the user terminal apparatus 100, determine whether the received IP address matches the IP address of the electronic apparatus 200 operating in emergency mode.

When the IP address received from the user terminal apparatus 100 matches the IP address of the electronic apparatus 200 operating in emergency mode, the server 300 may transmit, at operation S570, the map information corresponding to the location of the electronic apparatus 200 to the user terminal apparatus 100.

Figure 6:
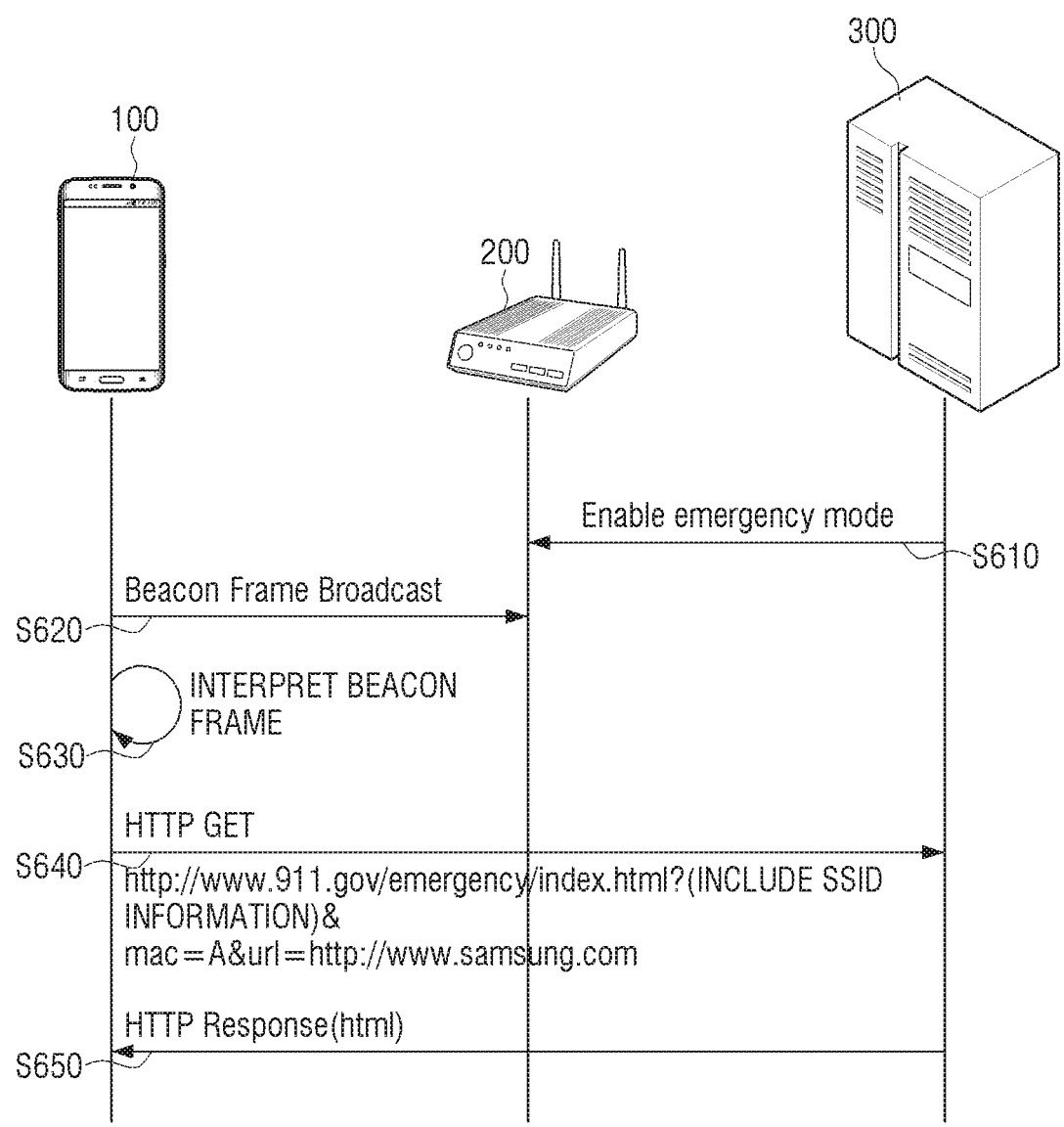
FIG. 6 is a signal flow diagram illustrating an operation of a communication network system according to an embodiment of the disclosure.

FIG. 6 is a signal flow diagram illustrating an operation of a communication network system according to an embodiment of the disclosure.

Referring to FIG. 6, the electronic apparatus 200 according to an embodiment may be an electronic apparatus that broadcasts a beacon frame in the normal mode. Specifically, the electronic apparatus 200 is an external electronic apparatus that can be communicatively connected in the normal mode and may be an electronic apparatus that broadcasts the beacon frame including service set identifier (SSID) information of the electronic apparatus 200.

Accordingly, the user terminal apparatus 100 around the electronic apparatus 200 may, based on the SSID information of the electronic apparatus 200 included in the beacon frame, be communicatively connected to the electronic apparatus 200.

As described above, the server 300 may, based on the predetermined event such as a fire, an explosion and the like being occurred, transmit, at operation S610, the request to operate in emergency mode to the electronic apparatus 200.

For example, the server 300 may, based on the predetermined event occurring, determine an electronic apparatus located in a point where the predetermined event has occurred and transmit the request to operate in emergency mode to a corresponding electronic apparatus.

The server 300 may determine the electronic apparatus 200 is located at the point where the predetermined event has occurred based on the SSID information of the electronic apparatus 200. Specifically, the server 300 may determine the electronic apparatus 200 located at the point where the predetermined event has occurred based on the location information matched by each SSID information of the electronic apparatus 200.

The electronic apparatus 200 may, based on the request to operate in emergency mode being received from the server 300, operate in emergency mode. Specifically, the electronic apparatus 200 may operate in emergency mode and broadcast, at operation S620, the beacon frame further including information indicating emergency mode in addition to the SSID information of the electronic apparatus 200. That is, the electronic apparatus 200 may transmit a first beacon frame in a case that the electronic apparatus 200 is operating in a normal mode and a second beacon frame, different from the first beacon frame, in a case that the electronic apparatus 200 is operating in the emergency mode.

The user terminal apparatus 100 may determine, at operation S630, whether the broadcasted beacon frame includes information indicating emergency mode. For example, the user terminal apparatus 100 may interpret the beacon frame to determine whether the received beacon frame is associated with a normal operation mode or an emergency operation mode. In an exemplary embodiment, the user terminal apparatus 100 may determine whether the beacon frame includes the information indicating emergency mode using a predetermined emergency information application.

In addition, the user terminal apparatus 100 may, based on the information indicating emergency mode being included in the beacon frame, transmit a request including the SSID information of the electronic apparatus 200 to the server 300.

For example, after receiving the beacon frame including information indication emergency mode, the user terminal apparatus 100 may, based on a user input for accessing to the web server being received, transmit, at operation S640, the request including the SSID information of the electronic apparatus 200 to the server 300, not the web server. While FIG. 6 illustrates that the user terminal apparatus 100 directly communicates the request of operation S640 to the server 300, alternatively, the user terminal apparatus 100 may communicate the request of operation S640 through the electronic apparatus 200.

Thereafter, the server 300 may, based on the SSID information of the electronic apparatus 200 received from the user terminal apparatus 100, determine whether the received SSID information matches the SSID information of the electronic apparatus operating in the emergency mode.

When the SSID information received from the user terminal apparatus 100 matches the SSID information of the electronic apparatus 200 operating in the emergency mode, the server 300 may transmit, at operation S650, the map information corresponding to the electronic apparatus 200 to the user terminal apparatus 100.

While FIG. 6 contemplates that the server 300 transmits the request to enable the emergency mode in operation S610 and the message included in operation S650, according to an embodiment, the server for transmitting the request to operate in emergency mode may be different from the server that transmits the map information. Specifically, the request to operate in the emergency mode may be a server associated with a plurality of buildings, and the server that transmits the map information may be a server associated with one building where the predetermine event such as a fire and the like has occurred.

Figure 7:
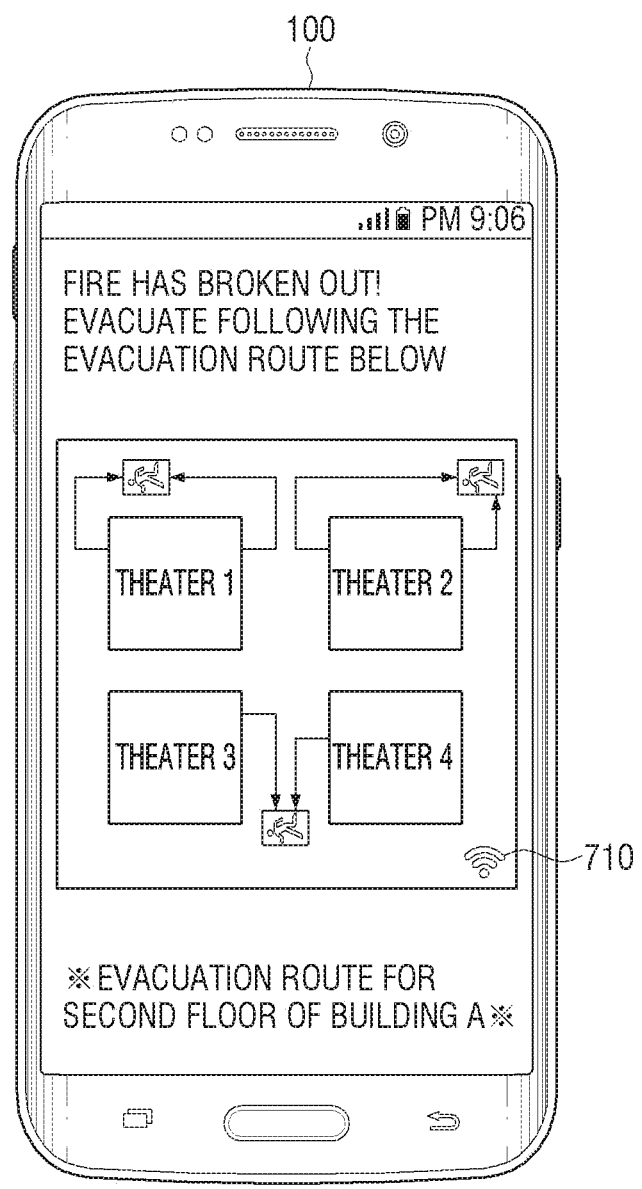
FIGS. 7 and 8 illustrate a user interface (UI) including map information provided by a server according to various embodiments of the disclosure.
Figure 8:
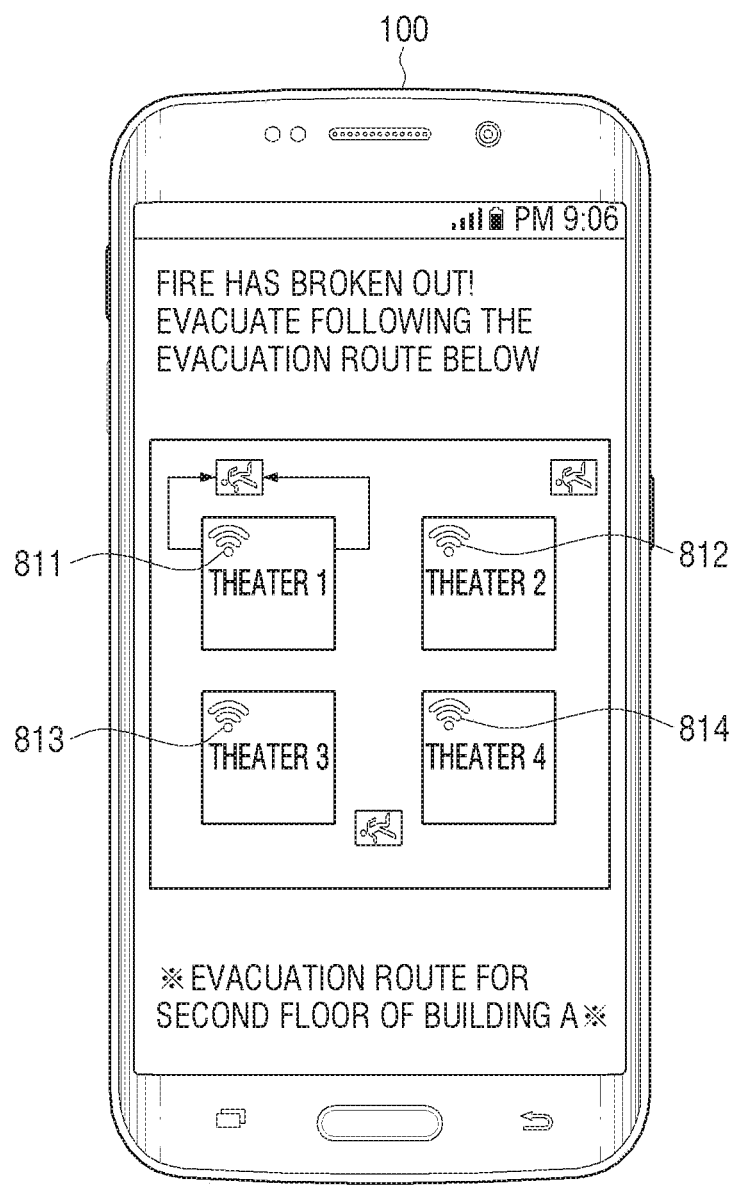

FIGS. 7 and 8 illustrate a UI including map information provided by a server according to various embodiments of the disclosure.

Referring to FIGS. 7 and 8, the processor 320 may transmit map information corresponding to a location of the electronic apparatus 200 to the user terminal apparatus 100.

The map information may include information on the evacuation route for evacuating a point where the electronic apparatus 200 is located.

For example, referring to FIG. 7, when an electronic apparatus 200 is located on the second floor of a building A, that provides a movie screening service, the map information may include a visual indicator 710 associated with the electronic apparatus 200 as well as information on an evacuation route directing a user to proceed to the emergency exit to evacuate the second floor of the building A.

For another example, referring to FIG. 8, when an electronic apparatus 200 is located in theater one of the second floor of the building A, the map information may include information on the evacuation route directing to proceed to the emergency exit in order to evacuate the theater one of the second floor of the building A. That is, the server 300 may provide a route for evacuating from a point where the electronic apparatus 200 is located which is communicatively connected to the user terminal apparatus 100, among a plurality of electronic apparatus, as map information. Visual indicator 811 may correspond to a location of the electronic apparatus 200 and visual indicators 812, 813 and 814 may correspond to a location of each of the plurality of electronic apparatuses, respectively.

Although FIG. 8 only discloses an evacuation route for evacuating from the theater one, map information may further include an evacuation route for evacuating from each of a theater two to a theater four according to an embodiment. In this case, the processor 320 may display the evacuation route for evacuating an area where the electronic apparatus 200 associated with visual indicator 811, which is communicatively connected to the user terminal apparatus 100, is located differently from the rest of evacuation routes.

For example, the processor 320 may display the evacuation route for evacuating the area where the electronic apparatus 200 is located in a different color from the rest of the evacuation routes, or display by different thickness lines. In addition, the map information may further include information on what emergency has occurred. For example, when fire has occurred, the map information may include text informing that a fire has occurred as illustrated in FIGS. 7 and 8.

Figure 9:
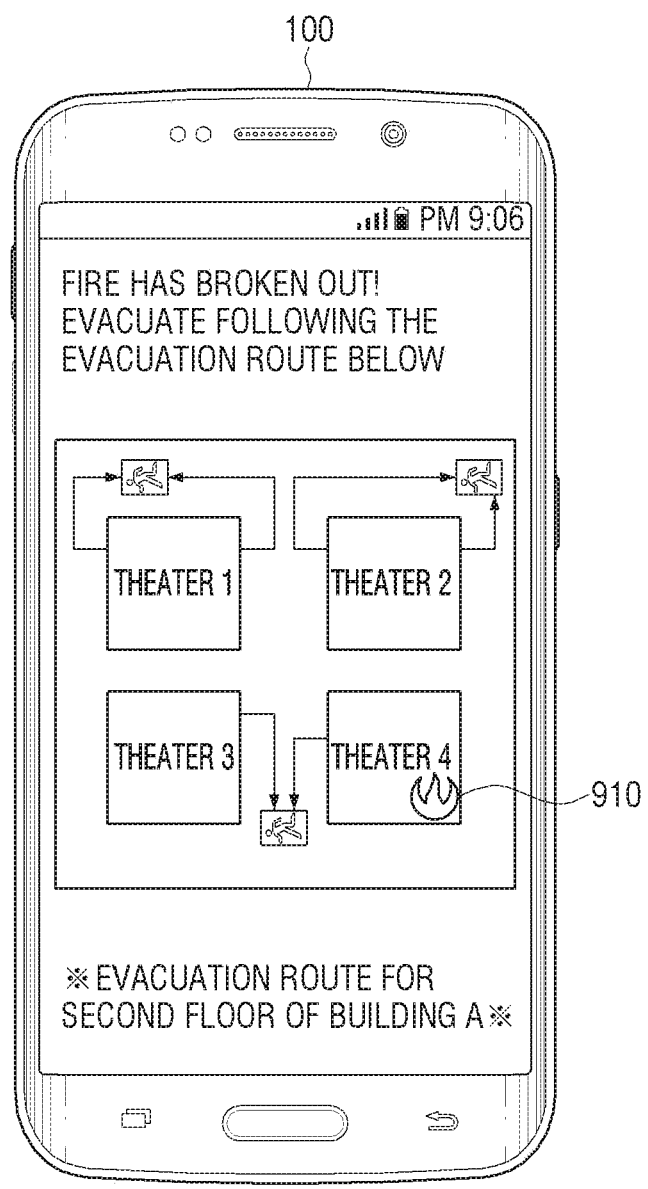
FIG. 9 illustrates a UI including map information including information on a point where a predetermined event has occurred according to an embodiment of the disclosure.

FIG. 9 illustrates a UI including map information including information on a point where a predetermined event has occurred according to an embodiment of the disclosure.

Referring to FIG. 9, the processor 320 may transmit map information including information on the point where the predetermined event has occurred to the user terminal apparatus 100.

The point where the predetermined event has occurred may be a point where an emergency such as a fire, flooding, an explosion and the like has occurred.

For example, the processor 320 may provide information associated the point where the predetermined event has occurred to the user terminal apparatus 100 through various visual indicators such as a fire icon 910 as well as to the user terminal apparatus 100 through text.

For example, referring to FIG. 9, when the predetermined event such as a fire and the like has occurred in the theater 4 of the second floor of the building A which provides a movie screening service, the processor 320 may transmit map information displaying the fire icon 910 to the user terminal apparatus 100.

Accordingly, a user may be aware of where an emergency has occurred and evacuate a dangerous point. The icon used to visually indicate the emergency event may vary based on the type of emergency event that is occurring.

Figure 10:
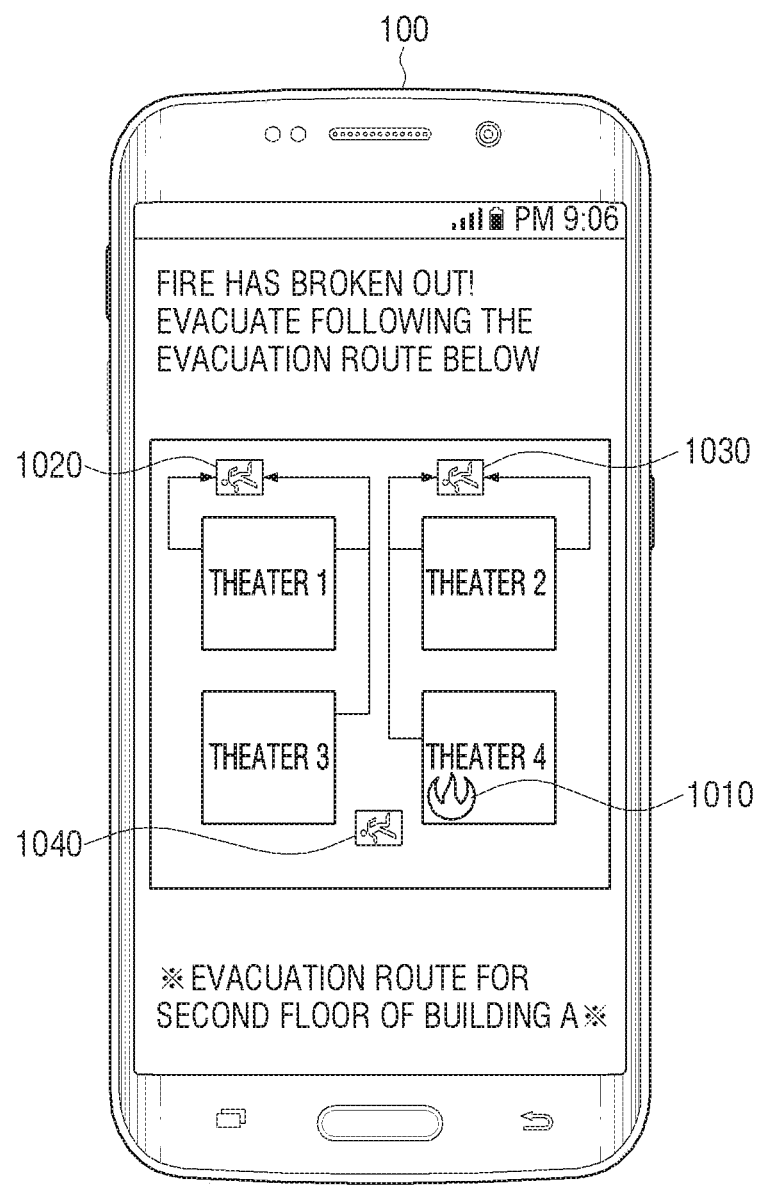
FIG. 10 illustrates a UI including an alternative evacuation route according to a point where a predetermined event has occurred according to an embodiment of the disclosure.

FIG. 10 illustrates a UI including an alternative evacuation route according to a point where a predetermined event has occurred according to an embodiment of the disclosure.

Referring to FIG. 10, the processor 320 may change or modify the evacuation route according to the point where the predetermined event has occurred.

For example, the processor 320 may, based on information on the point where the predetermined event, such as a fire and the like, has occurred being received, change the evacuation route within the predetermined distance from the point where the predetermined event has occurred to another evacuation route.

For example, referring to FIG. 10, when the predetermined event, such as a fire and the like, has occurred in the theater four of the second floor of the building A, which provides a movie screening service, the processor 320 may change the evacuation route with respect to an emergency exit 1040 within the predetermined distance from the point where the predetermined event has occurred to an evacuation route using other emergency exits 1020 and 1030. That is, users are typically instructed to exit through the closest emergency exit. However, since the emergency exit 1040 is closest to the location of the predetermined event, a user may be unaware that another emergency exit may afford a user a more direct route away from the predetermined event. Therefore, the processor 320 may generate the map information based on a location of an emergency exit with respect to a location of the predetermined event.

Accordingly, the user may evacuate from the dangerous point by a safer evacuation route.

Figure 11:
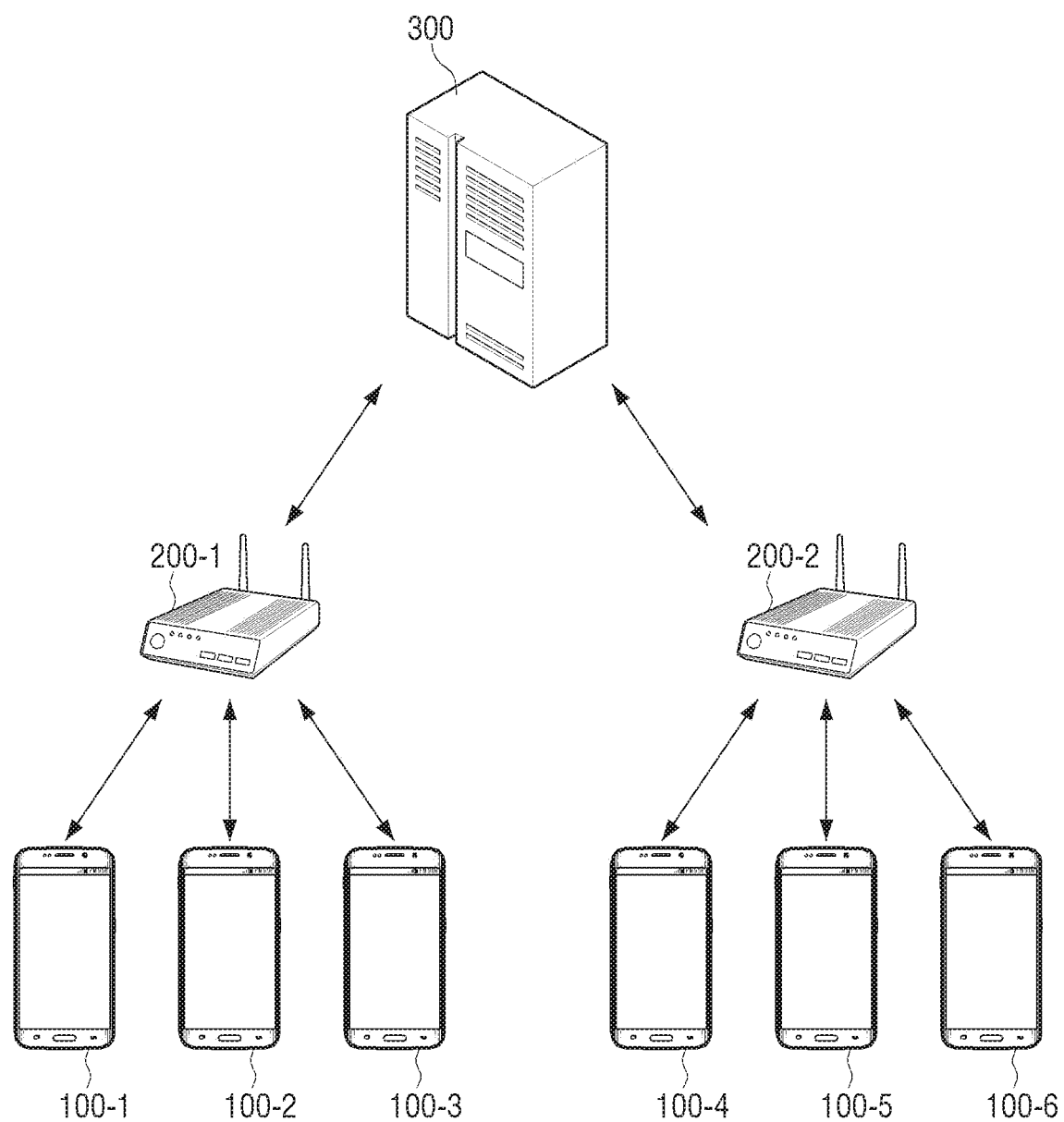
FIG. 11 is a schematic illustration of a communication network for enabling an emergency mode for a plurality of electronic apparatuses according to an embodiment of the disclosure.

FIG. 11 is a schematic illustration of a communication network for enabling an emergency mode for a plurality of electronic apparatuses according to an embodiment of the disclosure.

Referring to FIG. 11, the processor 320 of the server 300 may determine at least one other electronic apparatus 200-2 within the predetermined distance from an electronic apparatus 200-1 operating in emergency mode, and transmit the request to operate in the emergency mode to the at least one other electronic apparatus 200-2. Hereinafter, for convenience of description, the electronic apparatus 200-1 is referred to as the first electronic apparatus, and the other electronic apparatus 200-2 is referred to as the second electronic apparatus.

For example, the processor 320 of the server 300 may determine that the second electronic apparatus 200-2 is within the predetermined distance from the first electronic apparatus 200-1 operating in emergency mode based on location information matched by each IP address of the electronic apparatus 200-1 and 220-2. The predetermined distance may variously set to a value, such as 30 m, 50 m and the like, according to a user command.

In addition, the processor 320 of the server 300 may transmit the request to operate in the emergency mode to the second electronic apparatus 200-2.

Accordingly, the second electronic apparatus 200-2 may operate in emergency mode just like the electronic apparatus 200-1.

Thereafter, the processor 320 of the server 300 may, based on information on an IP address of the second electronic apparatus 200-2 received from at least one user terminal apparatus 100-4, 100-5 or 100-6, which are communicatively connected to the second electronic apparatus 200-2, based on location information of the second electronic apparatus 200-2 corresponding to the IP address, transmit map information corresponding to the second electronic apparatus 200-2 to the user terminal apparatuses 100-4, 100-5 and 100-6. In this case, the processor 320 of the server 300 may transmit text indicating an emergency, such as a fire and the like, has occurred at a specific location to the user terminal apparatuses 100-4, 100-5 and 100-6 with the map information described above.

The processor 320 of the server 300 may also transmit map information corresponding to the first electronic apparatus 200-1 to at least one user terminal apparatuses 100-1, 100-2 or 100-3, which are communicatively connected to the first electronic apparatus 200-1.

Meanwhile, FIG. 11 discloses two electronic apparatuses 200-1 and 200-2, each having three user terminal apparatuses 100-1, 100-2, 100-3, 100-4, 100-5 and 100-6 which are communicatively connected to each of the two electronic apparatuses 200-1 and 200-2, respectively. However, this is merely for convenience of description and the number of the electronic apparatuses and the user terminal apparatuses are not limited thereto.

Figure 12A:
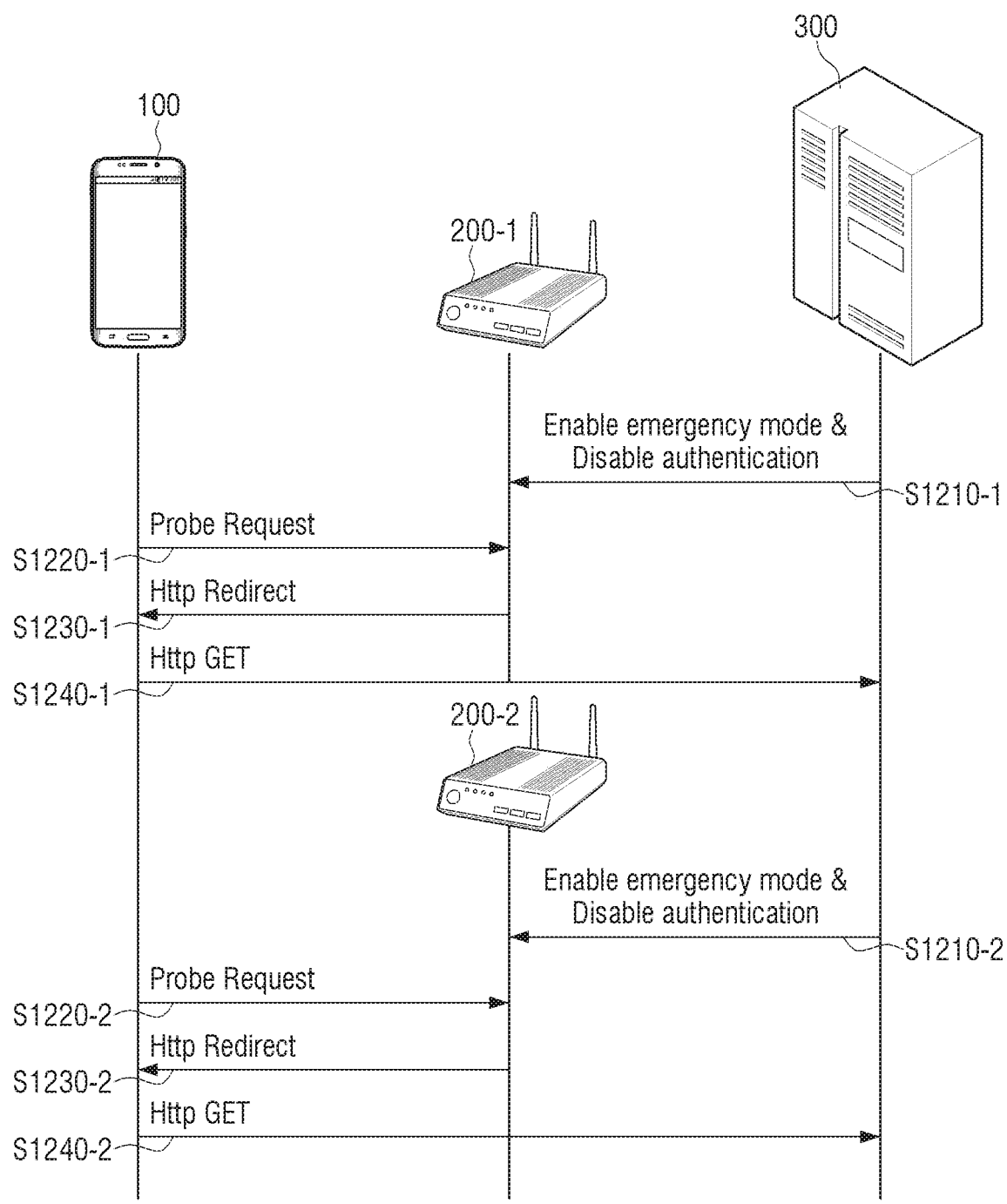
FIG. 12A is a signal flow diagram illustrating an operation of enabling an emergency mode for a plurality of electronic apparatuses according to an embodiment of the disclosure.
Figure 12B:
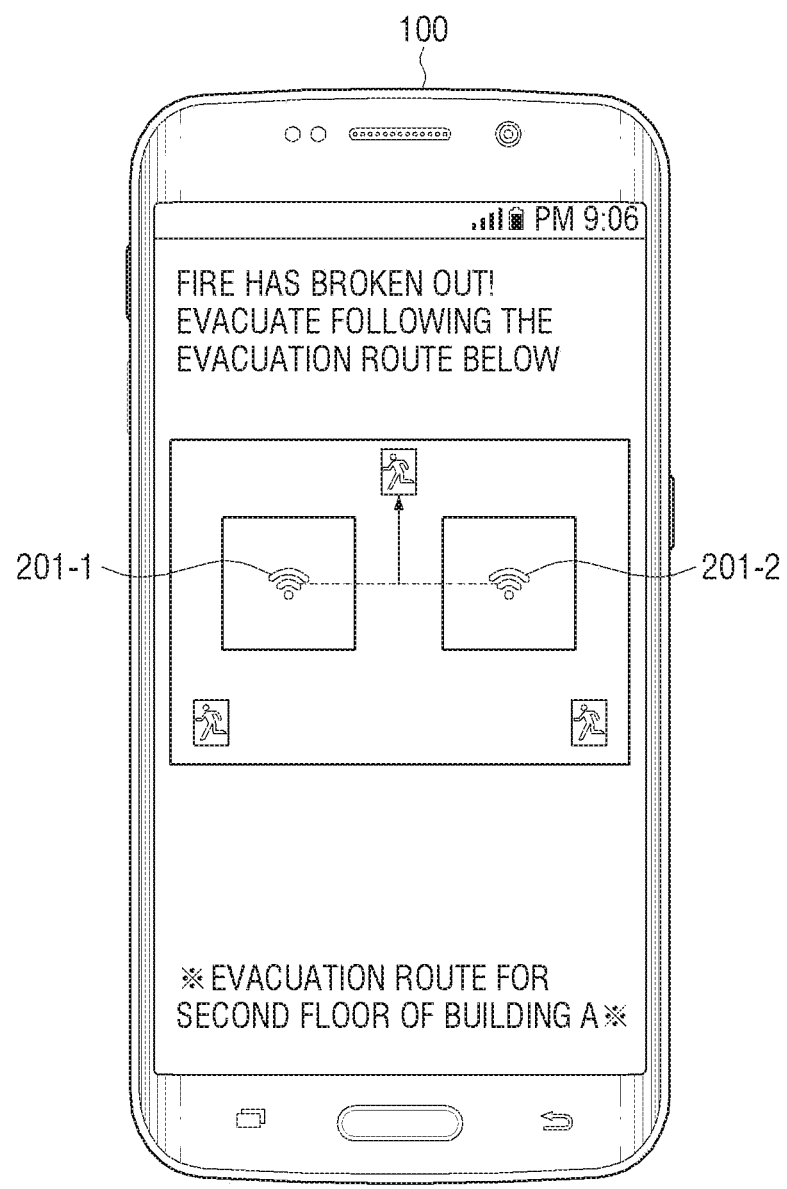
FIG. 12B illustrates a UI including an evacuation route according to a plurality of electronic apparatuses operating in an emergency mode according to various embodiments of the disclosure.

FIG. 12A is a signal flow diagram illustrating an operation of enabling an emergency mode for a plurality of electronic apparatuses according to an embodiment of the disclosure. FIG. 12B illustrates a UI including an evacuation route according to a plurality of electronic apparatuses operating in an emergency mode according to various embodiments of the disclosure.

Referring to FIGS. 12A and 12B, the server 300 may, based on the plurality of electronic apparatuses 200-1 and 200-2 being located within the predetermined distance from a point where the predetermined event has occurred, transmit a request to operate in emergency mode to the plurality of electronic apparatuses 200-1 and 200-2.

For example, when the first electronic apparatus 200-1 and the second electronic apparatus 200-2 are located within the predetermined distance from the point where an emergency such as a fire and the like has occurred, the server 300 may transmit, at operations S1210-1 and S1210-2, a request to operate in emergency mode to the first electronic apparatus 200-1 and the second electronic apparatus 200-2, respectively. The predetermined distance may be variously set to a value, such as 20 m, 40 m, and the like, according to a user command.

Referring to FIG. 12A, the server 300 may transmit a request to disable an authentication process to each of the first electronic apparatus 200-1 and the second electronic apparatus 200-2 in order that the user terminal apparatus 100 may be communicatively connected to the electronic apparatus 200-1 or 200-2 without the authentication process.

Thereafter, the user terminal apparatus 100 may, based on a user input for activating a communication function such as a Wi-Fi network being received, scan at operations, S1210-1 and S1210-2, a nearby electronic apparatus that can be communicatively connected.

The user terminal apparatus 100 may be communicatively connected to one of the first electronic apparatus 200-1 and the second electronic apparatus 200-2 without the authentication process.

While operating in emergency mode, based on a request to access a web server being received from the user terminal apparatus 100, the first electronic apparatus 200-1 and the second electronic apparatus 200-2 may transmit, at operations S1230-1 and S1230-2, a response including a URL address of the server 300, not the web server associated with the request, to the user terminal apparatus 100. Meanwhile, a response of the first electronic apparatus 200-1 may include an IP address of the first electronic apparatus 200-1, and a response of the second electronic apparatus 200-2 may include an IP address of the second electronic apparatus 200-2.

The user terminal apparatus 100 may transmit, at operations S1240-1 and S1240-2, a request to access the server 300 to the server 300 based on the response received from the first electronic apparatus 200-1 and the second electronic apparatus 200-2.

As described above, the response from the first electronic apparatus 200-1 may include the IP address of the first electronic apparatus 200-1, and the response from the second electronic apparatus 200-2 may include the IP address of the second electronic apparatus 200-2. Thus, the request to access to the server 300 that the user terminal apparatus 100 transmits to the server 300 based on the response from the first electronic apparatus 200-1 may include the IP address of the first electronic apparatus 200-1, and the request to access to the server 300, that the user terminal apparatus 100 transmits to the server 300 based on the response from the second electronic apparatus 200-2 may include the IP address of the second electronic apparatus 200-2.

Accordingly, the server 300 may receive information on the IP address of the first electronic apparatus 200-1 and information on the IP address of the second electronic apparatus 200-2 from the user terminal apparatus 100.

Thereafter, the server 300 may determine whether the IP address received from the user terminal apparatus 100 matches the IP address of the first electronic apparatus 200-1 or the IP address of the second electronic apparatus 200-2 operating in emergency mode.

When the IP address received from the user terminal apparatus 100 matches the IP addresses of the first electronic apparatus 200-1 or the second electronic apparatus 200-2 operating in emergency mode, the server 300 may determine a location of the first electronic apparatus 200-1 or a location of the second electronic apparatus 200-2 based on location information matched by each IP address of the electronic apparatus.

The server 300 may transmit map information corresponding to a midway point of a virtual line connecting the location of the first electronic apparatus and the location of the second electronic apparatuses to the user terminal apparatus 100. The midway point may be a midway point when a virtual line connecting the locations of the first electronic apparatus and the second electronic apparatus is divided into two, and may be a point within the predetermined distance from the midway point. In addition, map information corresponding to the midway point may include information on the evacuation route for evacuating the point where the predetermined event, such as a fire and the like has occurred, from the midway point described above.

Referring to FIG. 12B, when information on the IP address of the first electronic apparatus 200-1 located in a first office on the second floor of building A and information on the IP address of the second electronic apparatus 200-2 located in a second office on the second floor of the building are received from the user terminal apparatus 100, the server 300 may determine a midway point of a virtual line connecting a virtual indicator 201-1 associated with the first electronic apparatus 200-1 and a virtual indicator 201-2 associated with the second electronic apparatus 200-2, and transmit information on the evacuation route for evacuating from the point where the predetermined event has occurred to the user terminal apparatus 100.

In transmitting the map information corresponding to the midway point described above to the user terminal apparatus 100, the server 300 may first determine whether information on the IP addresses of the first electronic apparatus 200-1 and information on the IP address of the second electronic apparatus 200-2 are received at the predetermined time interval.

For example, if it is determined that the information on the IP address of the first electronic apparatus 200-1 and the information on the IP address of the second electronic apparatus 200-2 are sequentially received at the predetermined time interval, the server 300 may transmit the map information corresponding to the midway point described above to the user terminal apparatus 100.

For example, when the predetermined time interval is set to 10 seconds, and when information on the IP address of the second electronic apparatus 200-2 is received within 10 seconds from when the information on the first electronic apparatus 200-1 is received, the server 300 may transmit the map information corresponding to the aforementioned midway point to the user terminal apparatus 100.

This is because the user terminal apparatus 100 may be assumed as being located near the second electronic apparatus 200-2, not between the first and the second electronic apparatuses 200-1 and 200-2, if the information on the IP address of the second electronic apparatus 200-2 is received after the predetermined time interval passes from when the information on the IP address of the first electronic apparatus 200-1 is received, for example, after 2 hours.

Figure 13:
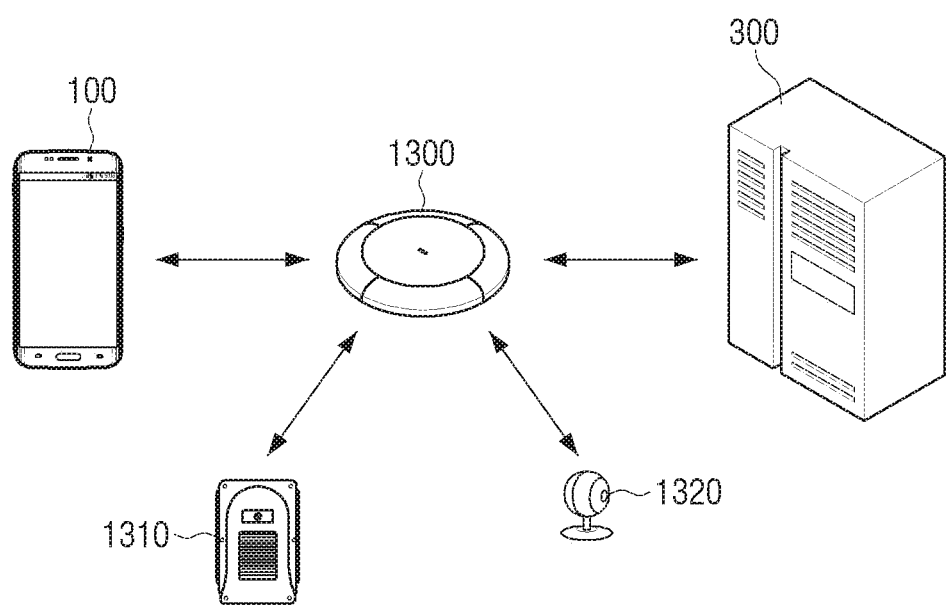
FIG. 13 is a schematic illustration of a communication network including an IoT hub according to an embodiment of the disclosure.

FIG. 13 is a schematic illustration of a communication network including an IoT hub according to an embodiment of the disclosure.

Referring to FIG. 13, the electronic apparatus 200 may be an IoT hub 1300 that relays communication between the user terminal apparatus 100 and the server 300.

In this case, the IoT hub 1300 may transmit/receive various data by performing communication with at least one IoT device 1310 and 1320. The IoT device 1310 and 1320 may include various sensors capable of detecting a state around the IoT device, such as a siren sensor, a thermal sensor, a web cam and the like.

Specifically, when an ambient temperature exceeds the predetermined threshold value, when an image including the predetermined color, for example, a red color which exceeds the predetermined threshold value is photographed, and the like, the IoT device 1310 or 1320 may transmit information that an emergency such as a fire and the like has occurred to the IoT hub 1300.

The IoT hub 1300 may transmit information received from the IoT device 1310 or 1320 to the server 300.

The server 300 may, based on information that the emergency such as a fire and the like has occurred being received from the IoT hub 1300, transmit the request to operate in emergency mode to a corresponding IoT hub 1300.

Accordingly, when operating in emergency mode and when a request to access a web server is received from the user terminal apparatus 100 connected to the IoT hub 1300, the IoT hub 1300 may transmit a response including an URL address of the server 300, not the web server, to the user terminal apparatus 100.

Thereafter, the server 300, based on information on an IP address of the IoT hub 1300 being received from the user terminal apparatus 100, may transmit map information corresponding to a location of the IoT hub 1300 to the user terminal apparatus 100.

Herein, an embodiment illustrated above is described as the electronic apparatus 200 is implemented as the IoT hub 1300, but the electronic apparatus 200 and the IoT hub 1300 may be implemented separately.

In this case, the server 300 may receive information that an emergency such as a fire and the like has occurred through the IoT hub 1300 from an IoT device 1310 or 1320 located at a specific location.

The server 300 may, based on information that the emergency has occurred being received, based on location information of the IoT device, identify the electronic apparatus 200 within the predetermined distance from the IoT device 1310 or 1320 and transmit a request to operate in emergency mode to the corresponding electronic apparatus 200. For this operation, the server 300 may store location information associated with each IoT device 1310 and 1320.

For example, the server 300 may determine that the electronic apparatus 200 is within the predetermined distance from the IoT device 1310 or 1320, if a signal strength between the IoT device 1310 or 1320 and the electronic apparatus 200 is greater than or equal to the predetermined strength. For this operation, the server 300 may receive information on the signal strength between the IoT device 1310 or 1320 and the electronic apparatus 200 from at least one of the IoT device 1310 or 1320 and the electronic apparatus 200. Alternately, the server 300 may identify the electronic apparatus 200 within the predetermined distance from the IoT device 1310 or 1320 based on the location information of the predetermined IoT device 1310 or 1320 and the location information of the predetermined electronic apparatus 200.

Figure 14:
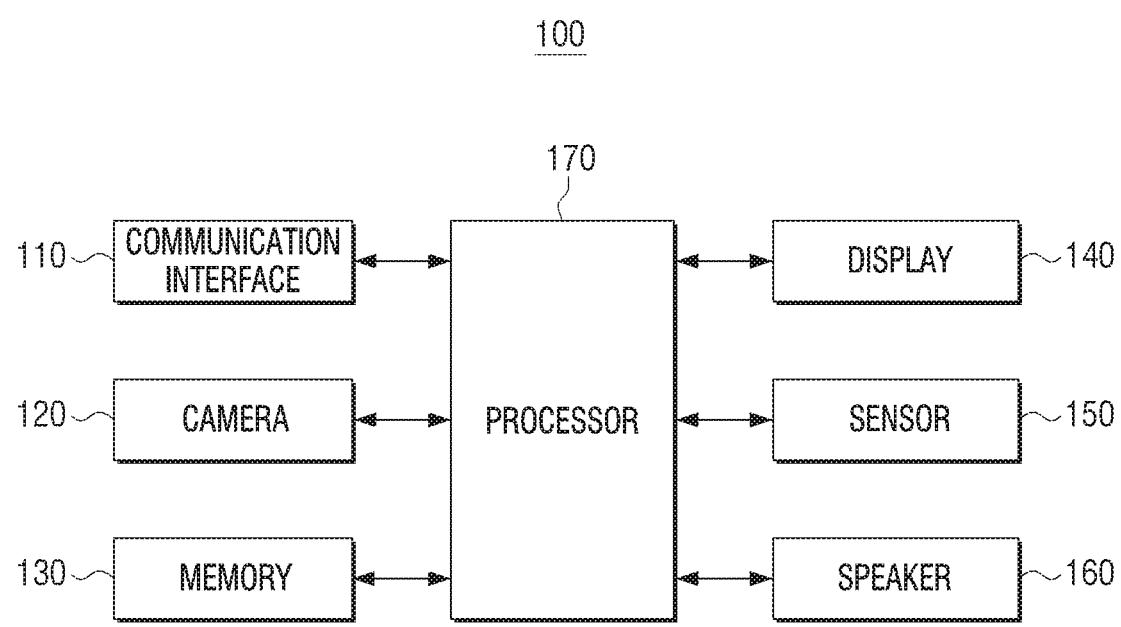
FIG. 14 is a block diagram illustrating a user terminal apparatus according to an embodiment of the disclosure.

FIG. 14 is a block diagram illustrating a user terminal apparatus according to an embodiment of the disclosure.

Referring to FIG. 14, the user terminal apparatus 100 may include a communication interface 110, a camera 120, a memory 130, a display 140, a sensor 150, a speaker 160 and a processor 170.

The communication interface 110 may transmit/receive various data by performing communication with the electronic apparatus 200. Particularly, the communication interface 110 may establish communication with the electronic apparatus 200 to receive a request to access the server 300. The request for accessing the server 300 may include the IP address of the electronic apparatus 200.

In addition, the communication interface 110 may transmit/receive various data by establishing communication with the server 300. Particularly, the communication interface 110 may establish communication with the server 300 to receive map information including information on the evacuation route.

For this, the communication interface 110 may include a Bluetooth chip, a Wi-Fi chip, a wireless communication chip, and the like.

The camera 120 may be configured to capture images of one or more objects or various subjects. The camera 120 may be implemented as a dual camera having a plurality of camera modules. However, this is only an embodiment, and the camera 120 may be implemented as one camera module.

The memory 130 may store various modules for driving or operating the user terminal apparatus 100.

The display 140 may be configured to display information including various images. Particularly, the display 140 may display the evacuation route based on map information received from the server 300.

The display 140 may be implemented as various types of displays, such as a Liquid Crystal Display (LCD), a Plasma Display Panel (PDP), and the like. The display 140 may include a driving circuit, a backlight unit, and the like which may be implemented in forms such as an a-Si thin film transistor (TFT), a low temperature poly silicon (LTPS) TFT, an organic TFT (OTFT), and the like. The display 140 may be combined with a touch sensor and implemented as a touch screen.

The sensor 150 may be implemented as various sensors for sensing a user command. For example, the detector 150 may include a touch sensor. The touch sensor may receive a user input for communication-connecting with the electronic apparatus 200.

The speaker 160 may be configured to output various kinds of audio data on which various processing operations such as decoding, amplification, and noise filtering are performed by an audio processor (not shown). In addition, the speaker 160 may output various alarm sounds or voice messages. According to an embodiment, the speaker 160 may output audio informing a dangerous situation when receiving map information from the server 300. In addition, the speaker 160 may output audio for guiding an evacuation route.

The processor 170 may control an overall operation of the user terminal apparatus 100. Particularly, the processor 170 may, based on a user input for activating a communication function such as Wi-Fi and the like being received, activate the communication interface 110 and scan for the electronic apparatus 200 capable of connecting a peripheral network.

The processor 170 may, based on a user input for setting a communication link with a specific electronic apparatus 200 being received, may establish a communication link with a corresponding electronic apparatus 200. When the electronic apparatus 200 provides a closed network, the processor 170 may, based on a password set in the electronic apparatus 200 being input, establish the communication link with the electronic apparatus 200. When the electronic apparatus 200 provides an open network, the processor 170 may, based on a user input for setting the communication link with the electronic apparatus 200 being received, set the communication link with the corresponding electronic apparatus 200 without the predetermined authentication process such as inputting a password. The user terminal apparatus 100 may be assigned an IP address of the electronic apparatus 200 from the electronic apparatus 200.

The processor 170 may, based on an application for attempting to connect to a specific portal site being executed or a user input for attempting to connect to a specific site being received through a specific application, transmit a request to access a web server that manages the corresponding site to the electronic apparatus 200.

When the electronic apparatus 200 operates in emergency mode, the processor 170 may receive a response including an URL address of the server 300 from the electronic apparatus 200 in order to attempt to connect to the server 300 different from the aforementioned web server.

Accordingly, the processor 170 may transmit the request for accessing to the server 300 to the server 300 based on the response. The request for accessing to the server 300 may include the IP address of the electronic apparatus 200.

Thereafter, the processor 170 may receive map information corresponding to the location of the electronic apparatus 200 which is generated based on the IP address of the electronic apparatus 200.

The processor 170 may, based on the received map information, display the evacuation route for evacuating a place where the electronic apparatus 200 is located.

Figure 15:
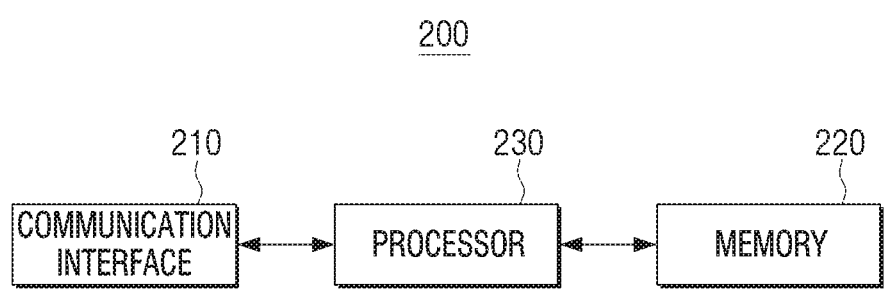
FIG. 15 is a block diagram illustrating an electronic apparatus according to an embodiment of the disclosure.

FIG. 15 is a block diagram illustrating an electronic apparatus according to an embodiment of the disclosure.

Referring to FIG. 15, the electronic apparatus 200 may include a communication interface 210, a memory 220, and a processor 230.

The communication interface 210 may be configured to establish communication with the server 300 to transmit/receive various data. Specifically, the communication interface 210 may be connected with the server 300 through various communication links such as Wi-Fi, Bluetooth and the like, to transmit/receive various data.

For example, the communication interface 210 may receive a request to operate in emergency mode from the server 300. In addition, the communication interface 210 may receive a request for disabling the authentication process of the electronic apparatus 200 from the server 300.

The communication interface 210 may establish communication with the user terminal apparatus 100 to transmit/receive various data. For example, the communication interface 210 may receive a request to access a specific web server from the user terminal apparatus 100. In addition, when the electronic apparatus 200 operates in emergency mode, the communication interface 210 may transmit a response including the URL address of the server 300 to the user terminal apparatus 100 in order to allow the user terminal apparatus 100 to attempt to connect to the server 300 different from the web server included in the original request.

The memory 220 may store an operating system (OS) for controlling an overall operation of components of the electronic apparatus 200 and instructions or data related to the components of the electronic apparatus 200.

The processor 230 may control the overall operation of the electronic apparatus 200. Particularly, the processor 230 may, based on the request to operate in the emergency mode received from the server 300, enable a mode of the electronic apparatus 200 to emergency mode.

In addition, while operating in the emergency mode, the processor 230 may, receive a request to access to a specific web server from the user terminal apparatus 100 and transmit a response including the URL address of the server 300 to the user terminal apparatus 100 in order allow the user terminal apparatus 100 to attempt to connect to the server 300, a different server from the web server included in the request to access the specific web server. The response may include the IP address of the electronic apparatus 200.

Figure 16:
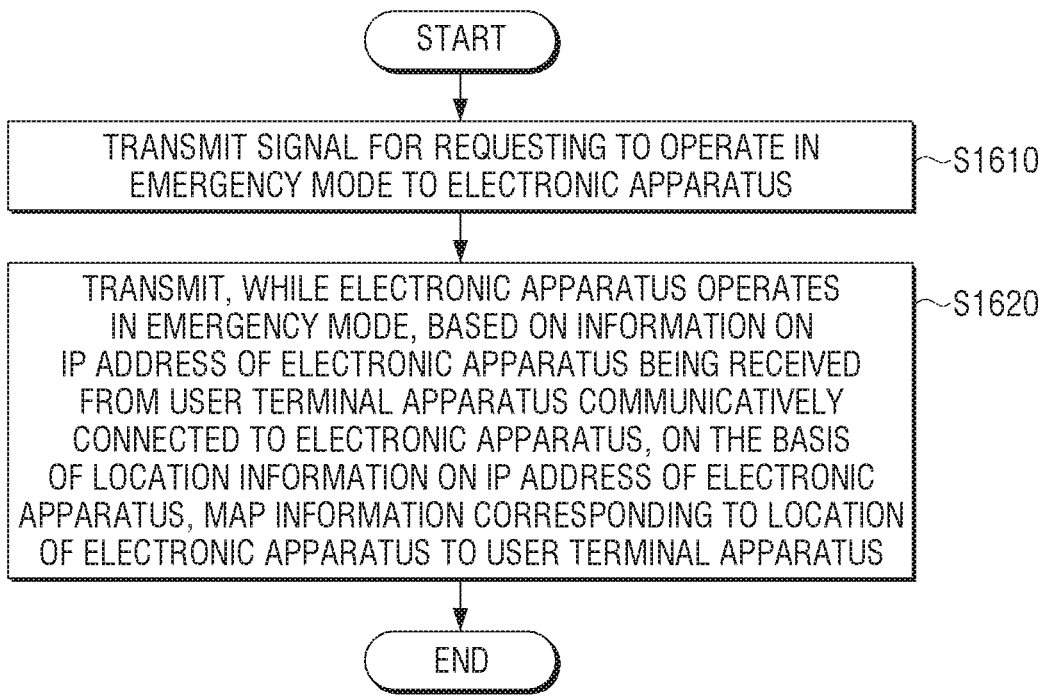
FIG. 16 is a flowchart illustrating an operation of a server according to an embodiment of the disclosure.

FIG. 16 is a flowchart illustrating an operation of a server according to an embodiment of the disclosure.

Referring to FIG. 16, the server 300 may transmit, at operation S1610), a request to operate in an emergency mode to the electronic apparatus 200. Specifically, the server 300 may receive information that a predetermined event such as a fire and the like has occurred and transmit, to the electronic apparatus 200, a request to operate in the emergency mode.

While the electronic apparatus 200 is operating in emergency mode, the server 300 may receive information on the IP address of the electronic apparatus 200 from the user terminal apparatus 100 that is communicatively connected to the electronic apparatus 200, based on location information of the electronic apparatus 200 that corresponds to the IP address, transmit, at operation S1620, map information corresponding to the location of the electronic apparatus 200 to the user terminal apparatus 100.

As described above, the map information may include information on the evacuation route for evacuating the point where the electronic apparatus 200 is located. Accordingly, a user of the user terminal apparatus 100 may quickly and safely evacuate the dangerous point based on the evacuation route provided by the server 300.

The methods according to the above-described embodiments may be realized as software/hardware upgrade that may be installed in the existing electronic apparatus.

The above-described embodiments may be executed through an embedded server in the electronic apparatus or through the external server outside the electronic apparatus.

The controlling method of an electronic apparatus according to the above-described various embodiments may be implemented as a program and stored in various recording media. In other words, a computer program which is processed by various processors to execute the above-described various control methods may be stored and used in a recording medium.

The non-transitory computer readable recording medium refers to a medium that stores data and that can be read by devices. In detail, the above-described various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

While the disclosure has been shown described with reference to various embodiments thereof, it will be understood by those skilled in the art that various changes in form and details may be made therein without departing from the spirit and scope of the disclosure as defined by the appended claims and their equivalents. Those skilled in the art will appreciate that the features described above can be combined in various ways to form multiple variations of the invention.

What is claimed is:

1. A server comprising:
a communication interface; and
at least one processor configured to:
transmit, to an electronic apparatus via the communication interface, a request to operate in an emergency mode, and
while the electronic apparatus is operating in the emergency mode, based on information on an internet protocol (IP) address of the electronic apparatus being received from a user terminal apparatus that is communicatively connected to the electronic apparatus, transmit map information corresponding to a location of the electronic apparatus to the user terminal apparatus based on location information matched with the IP address.

2. The server as claimed in claim 1, wherein the at least one processor is further configured to:
based on information on a location where a predetermined event has occurred, the information on the location being received from an external server:
determine the electronic apparatus located within a predetermined distance from the location where the predetermined event has occurred, and
transmit, to the electronic apparatus, the request to operate in the emergency mode.

3. The server as claimed in claim 2, wherein the at least one processor is further configured to transmit the map information comprising the information on the location where the predetermined event has occurred to the user terminal apparatus.

4. The server as claimed in claim 1, wherein the at least one processor is further configured to, while the electronic apparatus operates in the emergency mode, transmit a request for disabling an authentication process of the electronic apparatus to the electronic apparatus in order that the user terminal apparatus is connected to the electronic apparatus without authentication.

5. The server as claimed in claim 1, wherein the at least one processor is further configured to transmit the map information comprising information on an evacuation route for evacuating a place where the electronic apparatus is located to the user terminal apparatus.

6. The server as claimed in claim 5, wherein the at least one processor is further configured to, based on the information on a location where a predetermined event has occurred being received from an external server, transmit map information that the evacuation route is changed according to the location where the predetermined event has occurred to the user terminal apparatus.

7. The server as claimed in claim 1, wherein the at least one processor is further configured to:
determine at least one other electronic apparatus located within a predetermined distance from the electronic apparatus, and
transmit, to the at least one other electronic apparatus, the request to operate in the emergency mode.

8. The server as claimed in claim 1, wherein the at least one processor is further configured to,
based on information on an IP address of a first electronic apparatus and information on an IP address of a second electronic apparatus being received from the user terminal apparatus at a predetermined time interval,
determine locations of the first electronic apparatus based on the information on the IP address of the first electronic apparatus and locations of the second electronic apparatus based on the information on the IP address of the second electronic apparatus, and
transmit map information corresponding to a midway point of a virtual line connecting the location of the first electronic apparatus and the location of the second electronic apparatuses to the user terminal apparatus.

9. The server as claimed in claim 1, wherein the at least one processor is further configured to,
based on information that a predetermined event has occurred being received from an internet of things (IoT) device,
determine the electronic apparatus located within a predetermined distance from the IoT device, and
transmit, to the electronic apparatus, the request to operate in the emergency mode.

10. A method of controlling a server, the method comprising:
transmitting, to an electronic apparatus, a request to operate in an emergency mode; and
while the electronic apparatus is operating in the emergency mode, based on information on an internet protocol (IP) address of the electronic apparatus being received from a user terminal apparatus that is communicatively connected to the electronic apparatus, transmitting map information corresponding to a location of the electronic apparatus to the user terminal apparatus based on location information matched with the IP address.

11. The method as claimed in claim 10, wherein the transmitting of the request to operate in the emergency mode, comprises:
based on the information on a location where a predetermined event has occurred being received from an external server:
determining an electronic apparatus located within a predetermined distance from the location where the predetermined event has occurred; and
transmitting, to the electronic apparatus, a request to operate in the emergency mode.

12. The method as claimed in claim 11, wherein the transmitting of the map information to the user terminal apparatus comprises transmitting the map information comprising information on the location where the predetermined event has occurred to the user terminal apparatus.

13. The method as claimed in claim 10, further comprising while the electronic apparatus is operating in the emergency mode, transmitting a request for disabling an authentication process of the electronic apparatus to the electronic apparatus in order that the user terminal apparatus is connected to the electronic apparatus without authentication.

14. The method as claimed in claim 10, wherein the transmitting of the map information to the user terminal apparatus comprises transmitting the map information comprising information on an evacuation route for evacuating a place where the electronic apparatus is located to the user terminal apparatus.

15. The method as claimed in claim 14, the transmitting of the map information to the user terminal apparatus comprises based on the information on the a location where a predetermined event has occurred being received from an external server, transmitting the map information that the evacuation route is changed according to the location where the predetermined event has occurred to the user terminal apparatus.

16. The method as claimed in claim 10, further comprising:

determining at least one other electronic apparatus located within a predetermined distance from the electronic apparatus; and transmitting, to the at least one other electronic apparatus, the request to operate in the emergency mode.

17. The method as claimed in claim 10, further comprising:

based on information on an IP address of a first electronic apparatus and information on an IP address of a second electronic apparatus being received from the user terminal apparatus at a predetermined time interval, determining locations of the first electronic apparatus based on the information on the IP address of the first electronic apparatus and locations of the second electronic apparatus based on the information on the IP address of the second electronic apparatus; and transmitting map information corresponding to a midway point of a virtual line connecting the location of the first electronic apparatus and the location of the second electronic apparatus to the user terminal apparatus.

18. The method as claimed in claim 10, wherein the transmitting of the request to operate in the emergency mode, based on the information that thea predetermined event has occurred being received from an IoT device, determines the electronic apparatus located within a predetermined distance from the IoT device and transmits the request to operate in the emergency mode.

19. A communication network system comprising:

a server configured to transmit, to an electronic apparatus, a request to operate in an emergency mode; and a user terminal apparatus configured to, while the electronic apparatus is operating in emergency mode, based on a request for accessing to a web server being transmitted to the electronic apparatus, receive a response comprising a universal resource locator (URL) address of the server different from the web server from the electronic apparatus, and transmit, to the server, a request for accessing to the web server based on the URL address, wherein the server is further configured to, based on the request for accessing that comprises information on an internet protocol (IP) address of the electronic apparatus being received from the user terminal apparatus, transmit map information corresponding to a location of the electronic apparatus to the user terminal apparatus based on location information matched with the IP address.

20. The communication network system of claim 19, wherein, when the server receives a plurality of requests for accessing the server, each with an IP address of a different electronic apparatus within a predetermined time, the map information corresponds to a location that corresponds to a midpoint between locations of each electronic apparatus associated with the IP address transmitted.

* * * * *